US012536202B1

(12) United States Patent
Sahu et al.

(10) Patent No.: US 12,536,202 B1
(45) Date of Patent: Jan. 27, 2026

(54) SYSTEMS AND METHODS CONFIGURED FOR COMPUTATIONALLY EFFICIENT DATASET SAMPLING

(71) Applicant: Virtualitics, Inc., Pasadena, CA (US)

(72) Inventors: Sarthak Sahu, Pasadena, CA (US); Anthony Pineci, Pasadena, CA (US); Davide Vegliante, Pasadena, CA (US); Ebube Chuba, Pasadena, CA (US); Gennaro Zanfardino, Pasadena, CA (US); Benjamin English, Pasadena, CA (US); Michael Amori, Pasadena, CA (US); Ciro Donalek, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

(21) Appl. No.: 18/218,842

(22) Filed: Jul. 6, 2023

Related U.S. Application Data

(60) Provisional application No. 63/453,387, filed on Mar. 20, 2023.

(51) Int. Cl.
*G06F 16/28* (2019.01)
*G06F 16/22* (2019.01)

(52) U.S. Cl.
CPC ........ *G06F 16/287* (2019.01); *G06F 16/2246* (2019.01)

(58) Field of Classification Search
CPC .............. G06F 16/287; G06F 16/2246
See application file for complete search history.

(56) References Cited

U.S. PATENT DOCUMENTS

| | | | |
|---|---|---|---|
| 7,792,770 B1 * | 9/2010 | Phoha | G06N 20/00 706/45 |
| 11,269,875 B2 | 3/2022 | Tsumura et al. | |
| 11,481,668 B2 | 10/2022 | Modarresi et al. | |
| 11,481,672 B2 | 10/2022 | Pham et al. | |
| 2012/0117122 A1 * | 5/2012 | Wang | G06F 16/51 707/E17.005 |
| 2016/0188663 A1 * | 6/2016 | Tsumura | G06F 16/245 715/771 |
| 2017/0011111 A1 * | 1/2017 | Pallath | G06F 16/285 |
| 2018/0181877 A1 | 6/2018 | Wu et al. | |
| 2021/0287136 A1 * | 9/2021 | Das | G06Q 20/20 |
| 2024/0020556 A1 * | 1/2024 | Zou | G06N 7/00 |

* cited by examiner

*Primary Examiner* — Apu M Mofiz
*Assistant Examiner* — Husam Turki Samara
(74) *Attorney, Agent, or Firm* — GREENBERG TRAURIG, LLP

(57) ABSTRACT

Systems and methods of the present disclosure enable efficient dataset sampling by using one or more processors for receiving a sample request including a dataset, a target feature, and a sample size to be produced. The processor(s) determines, from a library of smart sampling algorithms based on the sample request, a smart sampling algorithm associated with a sampling parameter that satisfies the sample request. The processor(s) configures the sampling parameter of the smart sampling algorithm of a smart sampling engine to obtain a configured smart sampling engine to generate a smart sampled dataset that represents the target feature and satisfies the sample size. The processor(s) inputs the dataset into the configured smart sampling engine so as to cause the configured smart sampling engine to execute the smart sampling algorithm and output the smart sampled dataset, and returns the smart sampled dataset to the computing device.

20 Claims, 9 Drawing Sheets

SYSTEMS AND METHODS CONFIGURED FOR COMPUTATIONALLY EFFICIENT DATASET SAMPLING

CROSS-REFERENCE TO RELATED APPLICATIONS

This application claims priority to U.S. Provisional Application No. 63/453,387 filed on 20 Mar. 2023 and entitled "SYSTEMS AND METHODS CONFIGURED FOR DATASET SAMPLING," and is herein incorporated by reference in its entirety.

FIELD OF TECHNOLOGY

The present disclosure generally relates to computer-based systems and/or methods configured for dataset sampling, including efficient algorithmic sampling for dynamically optimized extraction of data samples from a dataset.

BACKGROUND OF TECHNOLOGY

Datasets are used for various applications, such as Big Data analytics, machine learning model training, scientific studies, medical studies, archiving, among other tasks. Entities may gather large amounts of data in various contexts in order to perform these tasks, resulting in vast datasets. Such datasets can drive increased computer resource demands such as storage, bandwidth, and compute resources.

SUMMARY

In some aspects, the techniques described herein relate to a method including: receiving, by at least one processor, a sample request from at least one computing device associated with a user; where the sample request including: a dataset including a plurality of data points, each data point including a plurality of features, at least one target feature of the plurality of features, and a sample size of a smart sampled dataset to be produced; determining, by the at least one processor, based on the sample request, a smart sampling algorithm from a library of smart sampling algorithms; where the smart sampling algorithm is associated with at least one sampling parameter that satisfies the sample size; configuring, by the at least one processor, the at least one sampling parameter of the smart sampling algorithm of a smart sampling engine to obtain a configured smart sampling engine to generate the smart sampled dataset having the sample size of the sample request; where the smart sampled dataset includes a sample of the plurality of data points so as to represent the at least one target feature; inputting, by the at least one processor, the dataset into the configured smart sampling engine so as to cause the configured smart sampling engine to: execute the smart sampling algorithm, and output the smart sampled dataset of the plurality of data points that represents the at least one target feature; and returning, by the at least one processor, the smart sampled dataset to the at least one computing device in response to the sample request.

In some aspects, the techniques described herein relate to a method, where executing the smart sampling algorithm includes: determining, by the at least one processor, a feature importance of each feature of the plurality of data points in the dataset; determining, by the at least one processor, at least one anomalous data point of the plurality of data points by inputting each data point into at least one anomaly detection model to output label indicative of whether each data point is anomalous or non-anomalous; generating, by the at least one processor, plurality of candidate samples based on randomly sampling the dataset; filtering, by the at least one processor, the plurality of candidate samples against a number of the at least one anomalous data point; determining, by the at least one processor, at least one test statistic for the plurality of candidate samples based at least in part on a similarity of: a candidate sample distribution associated with the plurality of candidate samples, and a dataset distribution associated with the dataset; filtering, by the at least one processor, the plurality of candidate samples based at least in part on the at least one test statistic; determining, by the at least one processor, a target feature importance of the at least one target feature of the plurality of candidate samples; determining, by the at least one processor, a ranking of the plurality of candidate samples based at least in part on a similarity measure of the target feature importance of each candidate sample to the feature importance of the dataset; and generating, by the at least one processor, the smart sampled dataset as a highest ranked candidate sample of the plurality of candidate samples based at least in part on the ranking.

In some aspects, the techniques described herein relate to a method, where executing the smart sampling algorithm includes: generating, by the at least one processor, a plurality of clusters of stratified data points from the plurality of data points in the dataset using at least one clustering model; for each cluster of the plurality of clusters, generating, by the at least one processor, a cluster-specific sub-sample based at least in part on simple random sampling of each cluster; and aggregating, by the at least one processor, the cluster-specific sub-sample of each cluster to produce the smart sampled dataset.

In some aspects, the techniques described herein relate to a method, where executing the smart sampling algorithm includes: generating, by the at least one processor, a plurality of clusters of stratified data points from the plurality of data points in the dataset using at least one clustering model; for each cluster of the plurality of clusters: generating, by the at least one processor, a k-dimensional tree (KD-tree) for the stratified data points associated with each cluster; iteratively over the stratified data points of each cluster: selecting, by the at least one processor, a particular stratified data point; querying, by the at least one processor, the KD-tree to determine a nearest neighbor of the particular stratified data point; and utilizing, by the at least one processor, update an inclusion probability for each of the particular stratified data point and the nearest neighbor; creating, by the at least one processor, a sub-sample for each cluster based at least in part on the inclusion probability of each stratified data point in each cluster; and aggregating, by the at least one processor, the sub-sample of each cluster to produce the smart sampled dataset.

In some aspects, the techniques described herein relate to a method, where the at least one sampling parameter includes a configured number of partitions from which to sample the plurality of data points.

In some aspects, the techniques described herein relate to a method, further including: matching, by the at least one processor, the sample size, and the target computation time to the at least one sampling parameter associated with each smart sampling algorithm in the library of smart sampling algorithm; and automatically determining, by the at least one processor, based on the sample size, the target computation time and the at least one sampling parameter associated with each smart sampling algorithm, the smart sampling algorithm from the library of smart sampling algorithms.

In some aspects, the techniques described herein relate to a method, further including: generating, by the at least one processor, at least one user interface on a display of the at least one computing device, where the at least one user interface is configured to enable the user to select at least one additional sampling parameter associated with the sample request; and determining, by the at least one processor, based on the sample request and the at least one additional sampling parameter, the smart sampling algorithm from the library of smart sampling algorithms.

In some aspects, the techniques described herein relate to a method, further including: generating, by the at least one processor, at least one user interface on a display of the at least one computing device, where the at least one user interface is configured to enable the user to select the smart sampling algorithm; and accessing, by the at least one processor, the smart sampling algorithm in the library of smart sampling algorithms.

In some aspects, the techniques described herein relate to a method including: receiving, by at least one processor, a sample request from at least one computing device associated with a user; where the sample request includes: a dataset including a plurality of data points, each data point including a plurality of features, at least one target feature of the plurality of features, a sample size of a smart sampled dataset to be produced, and a target computation time; determining, by the at least one processor, based on the sample request, a smart sampling algorithm from a library of smart sampling algorithms; where the smart sampling algorithm is associated with at least one sampling parameter that satisfies at least one of the sample size or the target computation time; where the library of smart sampling algorithms includes at least one of: a smart stratified random sampling algorithm, a smart local pivotal method sampling algorithm, or a smart validation-based sampling algorithm; configuring, by the at least one processor, the at least one sampling parameter of the smart sampling algorithm of a smart sampling engine to obtain a configured smart sampling engine to generate, within the target computation time, a smart sampled dataset having the sample size of the sample request; where the smart sampled dataset includes a sample of the plurality of data points so as to represent the at least one target feature; inputting, by the at least one processor, the dataset into the configured smart sampling engine so as to cause the configured smart sampling engine to: execute the smart sampling algorithm within the target computation time, and output the smart sampled dataset of the plurality of data points that represents the at least one target feature; and returning, by the at least one processor, the smart sampled dataset to the at least one computing device in response to the sample request.

In some aspects, the techniques described herein relate to a method, where the smart sampling algorithm includes the smart validation-based sampling algorithm; where executing the smart validation-based sampling algorithm includes: determining, by the at least one processor, a feature importance of each feature of the plurality of data points in the dataset; determining, by the at least one processor, at least one anomalous data point of the plurality of data points by inputting each data point into at least one anomaly detection model to output label indicative of whether each data point is anomalous or non-anomalous; generating, by the at least one processor, plurality of candidate samples based on randomly sampling the dataset; filtering, by the at least one processor, the plurality of candidate samples against a number of the at least one anomalous data point; determining, by the at least one processor, at least one test statistic for the plurality of candidate samples based at least in part on a similarity of: a candidate sample distribution associated with the plurality of candidate samples, and a dataset distribution associated with the dataset; filtering, by the at least one processor, the plurality of candidate samples based at least in part on the at least one test statistic; determining, by the at least one processor, a target feature importance of the at least one target feature of the plurality of candidate samples; determining, by the at least one processor, a ranking of the plurality of candidate samples based at least in part on a similarity measure of the target feature importance of each candidate sample to the feature importance of the dataset; and generating, by the at least one processor, the smart sampled dataset as a highest ranked candidate sample of the plurality of candidate samples based at least in part on the ranking.

In some aspects, the techniques described herein relate to a method, where the smart sampling algorithm includes the smart stratified random sampling algorithm; where executing the smart stratified random sampling algorithm includes: generating, by the at least one processor, a plurality of clusters of stratified data points from the plurality of data points in the dataset using at least one clustering model; for each cluster of the plurality of clusters, generating, by the at least one processor, a cluster-specific sub-sample based at least in part on simple random sampling of each cluster; and aggregating, by the at least one processor, the cluster-specific sub-sample of each cluster to produce the smart sampled dataset.

In some aspects, the techniques described herein relate to a method, where the smart sampling algorithm includes the smart local pivotal method sampling algorithm; where executing the smart local pivotal method sampling algorithm includes: generating, by the at least one processor, a plurality of clusters of stratified data points from the plurality of data points in the dataset using at least one clustering model; for each cluster of the plurality of clusters: generating, by the at least one processor, a k-dimensional tree (KD-tree) for the stratified data points associated with each cluster; iteratively over the stratified data points of each cluster: selecting, by the at least one processor, a particular stratified data point; querying, by the at least one processor, the KD-tree to determine a nearest neighbor of the particular stratified data point; and utilizing, by the at least one processor, update an inclusion probability for each of the particular stratified data point and the nearest neighbor; creating, by the at least one processor, a sub-sample for each cluster based at least in part on the inclusion probability of each stratified data point in each cluster; and aggregating, by the at least one processor, the sub-sample of each cluster to produce the smart sampled dataset.

In some aspects, the techniques described herein relate to a method, where the at least one sampling parameter includes a configured number of partitions from which to sample the plurality of data points.

In some aspects, the techniques described herein relate to a method, further including: matching, by the at least one processor, the sample size, and the target computation time to at least one parameter associated with each smart sampling algorithm in the library of smart sampling algorithm; and automatically determining, by the at least one processor, based on the sample size, the target computation time and the at least one parameter associated with each smart sampling algorithm, the smart sampling algorithm from the library of smart sampling algorithms.

In some aspects, the techniques described herein relate to a method, further including: generating, by the at least one processor, at least one user interface on a display of the at least one computing device, where the at least one user interface is configured to enable the user to select at least one additional parameter associated with the sample request; and determining, by the at least one processor, based on the sample request and the at least one additional parameter, the smart sampling algorithm from the library of smart sampling algorithms.

In some aspects, the techniques described herein relate to a method, further including: generating, by the at least one processor, at least one user interface on a display of the at least one computing device, where the at least one user interface is configured to enable the user to select the smart sampling algorithm; and accessing, by the at least one processor, the smart sampling algorithm in the library of smart sampling algorithms.

In some aspects, the techniques described herein relate to a system including: at least one processor in communication with a non-transitory computer readable medium having software instructions stored thereon, where the at least one processor is configured, upon execution of the software instructions, to: receive a sample request from at least one computing device associated with a user; where the sample request including: a dataset including a plurality of data points, each data point including a plurality of features, at least one target feature of the plurality of features, and a sample size of a smart sampled dataset to be produced; determine based on the sample request, a smart sampling algorithm from a library of smart sampling algorithms; where the smart sampling algorithm is associated with at least one sampling parameter that satisfies the sample size; configure the at least one sampling parameter of the smart sampling algorithm of a smart sampling engine to obtain a configured smart sampling engine to generate a smart sampled dataset having the sample size of the sample request; where the smart sampled dataset includes a sample of the plurality of data points so as to represent the at least one target feature; input the dataset into the configured smart sampling engine so as to cause the configured smart sampling engine to: execute the smart sampling algorithm, and output the smart sampled dataset of the plurality of data points that represents the at least one target feature; and return the smart sampled dataset to the at least one computing device in response to the sample request.

In some aspects, the techniques described herein relate to a system, where executing the smart sampling algorithm includes causing the at least one processor to: determine a feature importance of each feature of the plurality of data points in the dataset; determine at least one anomalous data point of the plurality of data points by inputting each data point into at least one anomaly detection model to output label indicative of whether each data point is anomalous or non-anomalous; generate plurality of candidate samples based on randomly sampling the dataset; filter the plurality of candidate samples against a number of the at least one anomalous data point; determine at least one test statistic for the plurality of candidate samples based at least in part on a similarity of: a candidate sample distribution associated with the plurality of candidate samples, and a dataset distribution associated with the dataset; filter the plurality of candidate samples based at least in part on the at least one test statistic; determine a target feature importance of the at least one target feature of the plurality of candidate samples; determine a ranking of the plurality of candidate samples based at least in part on a similarity measure of the target feature importance of each candidate sample to the feature importance of the dataset; and generate the smart sampled dataset as a highest ranked candidate sample of the plurality of candidate samples based at least in part on the ranking.

In some aspects, the techniques described herein relate to a system, where executing the smart sampling algorithm includes causing the at least one processor to: generate a plurality of clusters of stratified data points from the plurality of data points in the dataset using at least one clustering model; for each cluster of the plurality of clusters, generate a cluster-specific sub-sample based at least in part on simple random sampling of each cluster; and aggregate the cluster-specific sub-sample of each cluster to produce the smart sampled dataset.

In some aspects, the techniques described herein relate to a system, where executing the smart sampling algorithm includes causing the at least one processor to: generate a plurality of clusters of stratified data points from the plurality of data points in the dataset using at least one clustering model; for each cluster of the plurality of clusters: generate a k-dimensional tree (KD-tree) for the stratified data points associated with each cluster; iteratively over the stratified data points of each cluster: select a particular stratified data point; query the KD-tree to determine a nearest neighbor of the particular stratified data point; and utilize update an inclusion probability for each of the particular stratified data point and the nearest neighbor; create a sub-sample for each cluster based at least in part on the inclusion probability of each stratified data point in each cluster; and aggregate the sub-sample of each cluster to produce the smart sampled dataset.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
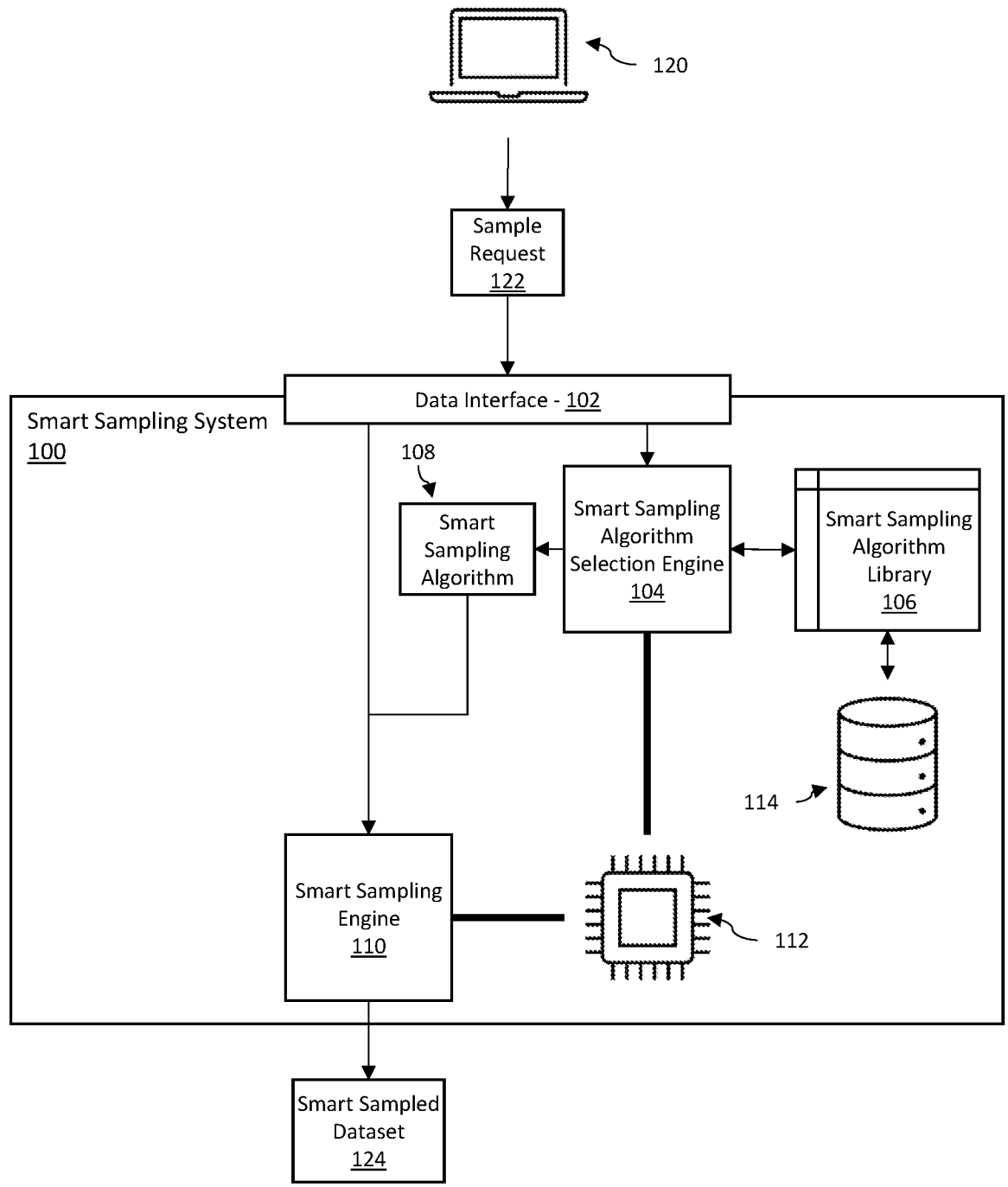
FIG. 1 is a block diagram of an exemplary computer-based system for smart dataset sampling in accordance with one or more embodiments of the present disclosure.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 9 illustrate systems and methods of intelligent and efficient sampling of a dataset to produce a representative sample of data in the dataset. The following embodiments provide technical solutions and technical improvements that overcome technical problems, drawbacks and/or deficiencies in the technical fields involving Big Data analytics, machine learning model training, scientific studies, medical studies, archiving, among other technical fields that employ datasets and data curation. Such technical fields often operate within resource constraints, including limitations on processing resources, storage resources, network or other communication bandwidth and time constraints. As explained in more detail, below, technical solutions and technical improvements herein include aspects of improved technologies for generating a sample of a dataset to fit within the constraints and limitations based on efficient and intelligent sampling. Based on such technical features, further technical benefits become available to users and operators of these systems and methods. Moreover, various practical applications of the disclosed technology are also described, which provide further practical benefits to users and operators that are also new and useful improvements in the art.

Referring to FIG. 1, a block diagram of an exemplary computer-based system for smart dataset sampling is illustrated in accordance with one or more embodiments of the present disclosure.

In some embodiments, users that have large datasets may want to use all of their data for analysis, however the tools that are currently available have limitations that prevent this, and with no standard approach to selecting subsamples of data. In some embodiments, a smart sampling system 100 suggests a subsample of data to perform further analysis and can take into account similarity across data points, parity with the original dataset, and anomalous data points.

Thus, in some embodiments, a user may provide a sample request 122 to the smart sampling system 100 to request a sample of a dataset. The smart sampling system 100 may be configured to receive the sample request 122, identify, extract and/or determine parameters and/or configurations of the sample request 122, select a smart sampling algorithm from a smart sampling algorithm library 106 based on the parameters and/or configurations, and automatically implement the selected smart sampling algorithm via a smart sampling engine 110 to produce a smart sampled dataset 124 that is sampled from the dataset of the sample request 122.

In some embodiments, the smart sampled dataset 124 produced by a smart sampling algorithm 108 and the dataset of the sample request 122 may include a subset of the dataset that meets the constraints and limitations on the analysis to be performed on the dataset. As such, the sample request 122 may specify one or more constraints and/or limitations, a sample size, among other configurations and/or parameters of the smart sampling to be performed. As a result, smart sampling system 100 may produce the smart sampled dataset 124 that is optimized to the constraints and/or limitations.

Moreover, in some embodiments, the smart sampling algorithm 108 may be subject to constraints and/or limitations on resource availability. Thus, the sample request 122 may specify such constraints and/or limitations. In some embodiments, the smart sampling algorithm selection engine 104 may automatically determine constraints and/or limitations based on, e.g., the dataset and/or the constraints and/or limitations on the analysis of the dataset, and/or past sample requests from the user.

In some embodiments, the user may use a computing device 120 to upload or otherwise communicate the sample request 122 to the smart sampling system 100 via a data interface 102. In some embodiments, the data interface 102 may include, e.g., a software and/or hardware interface that enables communication with the smart sampling system 100. As a result, the computing device 120 may display a user interface, such as a graphical user interface (GUI) for the input of the sample request 122 and/or any other parameters and/or configurations for sampling a dataset. In some embodiments, the parameters and/or configurations may include resource limitations, such as, e.g., a target computation time, a target network bandwidth, a target storage size of the sampled dataset, a network bandwidth maximum, a compute time maximum, a storage size maximum, a network bandwidth preference, a compute time preference, a storage size preference, a network bandwidth preference, a compute time preference, a storage size preference, among other parameters and/or configurations for resource usage or any combination thereof.

In some embodiments, the user interface may include one or more user selectable field and/or user input fields for defining the dataset, the desired size of the sample, any associated constraints and/or limitations, any other configurations and/or parameters or any other data or any combination thereof. In some embodiments, the data interface 102 may also deliver the output of the smart sampling, e.g., the smart sampled dataset 124, including one or more visualizations of the data. The visualizations may include, e.g., how the dataset is clustered using a plot of data points, selected data points versus all data points of the dataset, similarity across data points, parity with the dataset, and anomalous data points, among other visualizations and details. The visualizations may include visualization tools such as, e.g., descriptive text, tables, box plots, bar graphs, data point plots, line graphs, pie charts, among other visualization tools or any combination thereof.

In some embodiments, the data interface 102 may utilize one or more software computing interface technologies, such as, e.g., Common Object Request Broker Architecture (CORBA), an application programming interface (API) and/or application binary interface (ABI), among others or any combination thereof. In some embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. In some embodiments, CORBA may normalize the method-call semantics between application objects residing either in the same address-space (application) or in remote address-spaces (same host, or remote host on a network).

In some embodiments, the data interface 102 may utilize one or more hardware computing interface technologies using one or more wired interfacing technologies, e.g., Universal Serial Bus (USB), IEEE 1394 (FireWire), Ethernet, Thunderbolt™, Serial ATA (SATA) (including eSATA, SATAe, SATAp, mSATA, etc.), Peripheral Component Interconnect Express (PCIe), M.2, Small Computer System Interface (SCSI), among others or any combination thereof. In some embodiments, the data interface 102 may utilize one or more hardware computing interface technologies using one or more wireless interfacing technologies, e.g., WiFi, Bluetooth®, ZigBee®, Z-Wave®, LoRAN, Thread™, among others or any combination thereof.

In some embodiments, the computing device 120 may interact with the smart sampling system 100 using one or more suitable local and/or network communication protocols, such as, e.g., a messaging protocol, a networking protocol, one or more application programming interfaces (APIs), or other suitable technique for communicating between computing systems or any combination thereof. For example, the computing device 120 may interact with the smart sampling system 100 via the data interface 102 over a network including the Internet using the HyperText Transport Protocol (HTTP) to communicate one or more API requests to cause the smart sampling system 100 to perform implement the smart sampling algorithm on the dataset to produce the smart sampled dataset 124. In another example, the data interface 102 of the smart sampling system 100 is connected to the computing device 120 via a network, such as, e.g., Ethernet, Local Area Network (LAN), wireless LAN (WLAN), Wide Area Network (WAN), WiFi, Bluetooth, or other suitable networking technology or any combination thereof, and communicate via API requests and/or database queries in a suitable database query language (e.g., JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages). In another example, the smart sampling system 100 may be local to the computing device 120, such as, e.g., a software program installed on the computing device 120 and configured to employ computing hardware of the computing device 120 to perform smart sampling for the computing device 120. Thus, the data interface 102 may be a hardware and/or software interface of a local machine, server and/or cloud environment, such as, e.g., a data bus, component interface, etc. including the hardware interfaces detailed above. In some embodiments, any suitable combination of local, networked, cloud, distributed or other computing architecture may be employed to produce the smart sampled dataset 124 for display via the computing device 120.

In some embodiments, the data interface 102 may provide the sample request 122 along with any parameters and/or configurations to a smart sampling algorithm selection engine 104 for selecting the smart sampling algorithm from the smart sampling algorithm library 106. In some embodiments, the smart sampling algorithm library 106 may be stored in a data store 114. In some embodiments, the data store 114 may include, e.g., one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 111 may include, e.g., a suitable non-transient computer readable medium such as, e.g., random access memory (RAM), read only memory (ROM), one or more buffers and/or caches, among other memory devices or any combination thereof.

In some embodiments, the smart sampling algorithm selection engine 104 may automatically select a smart sampling algorithm 108 based on the sampling request 122 and/or any parameters and/or configurations. In some embodiments, the smart sampling algorithm selection engine 104 may determine user selection options based on the sampling request 122 and/or any parameters and/or configurations to enable the user to define, via the computing device 120, the smart sampling algorithm 108. In some embodiments, a combination of automated and manual operations may be performed to identify and select the smart sampling algorithm 108.

Indeed, in some embodiments, the smart sampling algorithm selection engine 104 may automatically determine one or more of the constraints and/or limitations of the analysis of the dataset, the constraints and/or limitations of the smart sampling algorithm 108 and/or the selection of the smart sampling algorithm 108 using one or more machine learning models. In some embodiments, the smart sampling algorithm selection engine 104 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the smart sampling algorithm selection engine 104 may return the selected smart sampling algorithm 108 and provide the smart sampling algorithm 108 to the smart sampling engine 110. In some embodiments, the smart sampling algorithm selection engine 104 may include one or more software and/or hardware components for generating a query to and/or accessing the data store 114 for the smart sampling algorithm 108 and communicating the smart sampling algorithm 108 to the smart sampling engine 110. In some embodiments, the smart sampling engine 110 may include one or more software and/or hardware components for running the smart sampling algorithm 108 on the dataset of the sample request 122.

For example, in some embodiments, the hardware components may include a processor 112, which may include local or remote processing components. In some embodiments, the processor 112 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 112 may include data-processing capacity provided by the microprocessor. In some embodiments, the microprocessor may include memory, processing, interface resources, controllers, and counters. In some embodiments, the microprocessor may also include one or more programs stored in memory.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Figure 2:
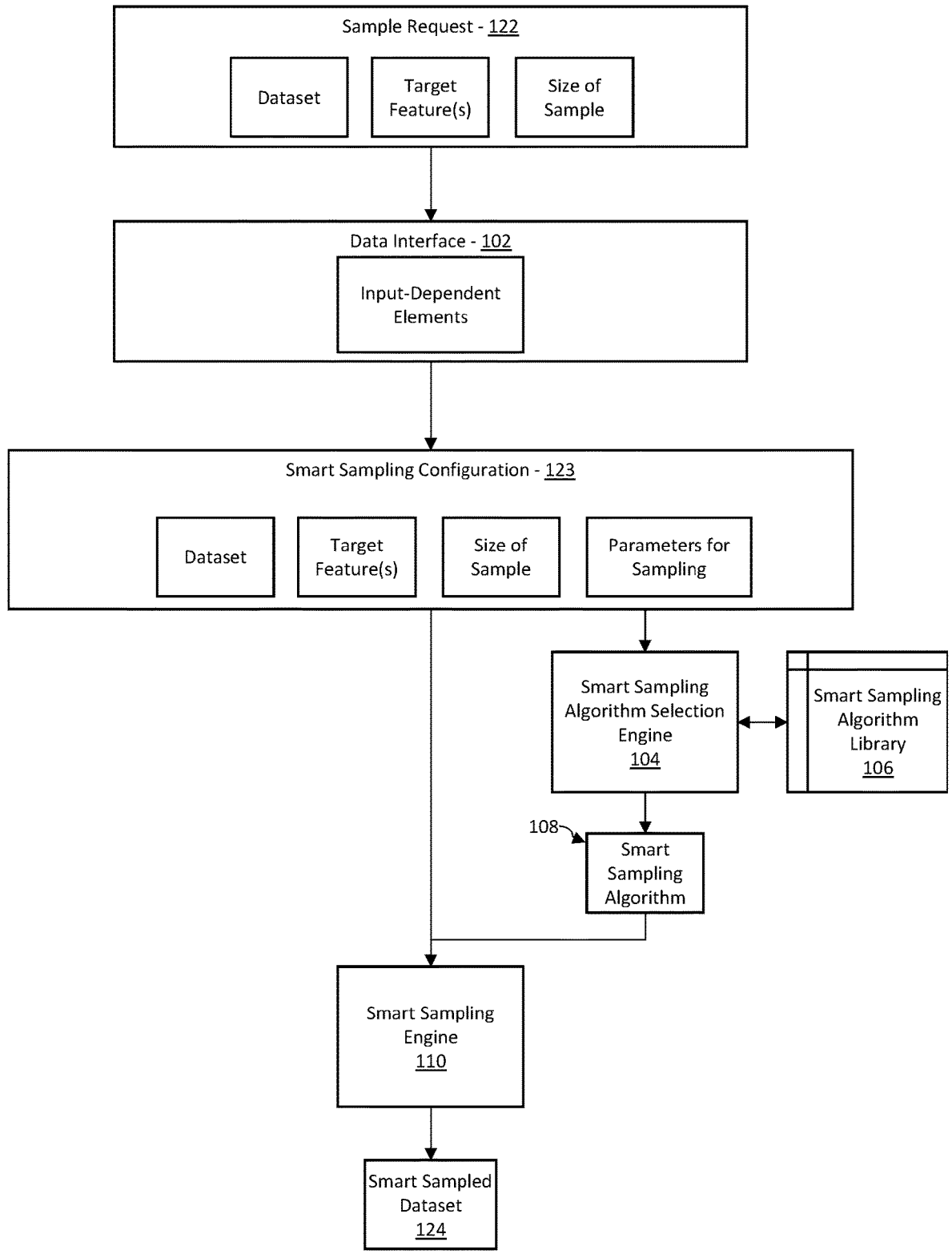
FIG. 2 is a block diagram of an exemplary computer-based system for smart dataset sampling in accordance with one or more embodiments of the present disclosure.

Referring to FIG. 2, a block diagram of an exemplary computer-based system for smart dataset sampling is illustrated in accordance with one or more embodiments of the present disclosure.

In some embodiments, the data interface 102 interacts with the computing device 120 to present to the user the user interface for defining the sample request 122. Accordingly, the user interface may include user interface elements that provide user-interactive components to enable the user to make selections, input information, upload data, and/or upload the dataset to be sampled. In some embodiments, via the user interface, the user may define the sample request 122. In some embodiments, the sample request 122 may include the dataset to be sampled and the size of the sample to be produced. In some embodiments, the sample request 122 may include other parameters, such as target feature(s) for which the smart sampled dataset 124 is intended to be representative and/or any other parameters on the sampling of the dataset or any combination thereof, such as one or more resource usage parameters, including, e.g., a target computation time, a target network bandwidth, a target storage size of the sampled dataset, a network bandwidth maximum, a compute time maximum, a storage size maximum, a network bandwidth preference, a compute time preference, a storage size preference, a network bandwidth preference, a compute time preference, a storage size preference, among other parameters and/or configurations for resource usage or any combination thereof. In some embodiments, the target feature(s) may be specified features of the data that is relevant to the user's purpose for the dataset (e.g., based on the data or behavior to be modelled via training of machine learning model, relevant insights to be determined from analysis of the dataset, among other applications or any combination thereof). Thus, the target feature(s) may include predetermined and/or user specified features of the data that are related to or determined by, e.g., Key-Performance Indicators (KPI) and/or key features for the application of the dataset, among others or any combination thereof. Specifying target features can be useful in determining a set of one or more features that most contribute to the behavior or value of the target feature(s), identifying similarities in the data for assessing how well a sample represents the dataset, among other advantages.

In some embodiments, in response to the sample request 122, the data interface 102 may interact with the computing device 120 to present input-dependent selections/parameters to the user via the user interface. Such input-dependent selections/parameters may include, e.g., a target computation time, a target network bandwidth, a target storage size of the sampled dataset, a network bandwidth maximum, a compute time maximum, a storage size maximum, a network bandwidth preference, a compute time preference, a storage size preference, a network bandwidth preference, a compute time preference, a storage size preference, among other resource parameters, data filtering parameters to filter the data before or after sampling, a number of samples to take from the dataset, termination criterion (e.g., inclusion probability threshold, confidence score threshold, statistical test score threshold, etc.), a tolerance for anomalies (e.g., whether and to what extent to include or remove anomalies/rare events/outliers), a statistical distribution test to be used (e.g., Anderson-Darling, Kolmogorov-Smirnov test, statistical bootstrap, Kuiper's test, Tukey-Duckworth test, Chi-squared test, etc.), KPI and/or key or target features to use (if not already specified by the sample request 122), among others or any combination thereof. In some embodiments, the parameters for sampling may be input via the input-dependent elements of the data interface 102, or may be provided via the sample request 122, or any combination thereof.

In some embodiments, the sample request 122 may include a target application for the dataset (e.g., type of behavior to be modelled, type of insights to be determined from the dataset, etc.). Thus, the input-dependent selections/parameters include dynamically generated selections for target features, KPIs, key features, or other formulations of a subset of the features of the dataset to optimize the sample for the target application. The user may then select, via the user interface, the desired subsets of the features. In some embodiments, the subsets may be automatically selected by the computing device 120, data interface 102, the smart sampling algorithm selection engine 104 and/or other components of the computing device 120, smart sampling system 110 and/or associated local/remote computing system.

In some embodiments, the data interface 102 may produce a smart sampling configuration 123 based on the dataset to be sampled, the size of the sample to be produced, the target feature(s) for which the smart sampled dataset 124 is intended to be representative of, the target computation time and/or any other input-dependent selections/parameters. In some embodiments, the smart sampling algorithm selection engine 104 may use the smart sampling configuration 123 to identify the smart sampling algorithm 108. In some embodiments, the smart sampling algorithm selection engine 104 may access the smart sampling algorithm library using, e.g., database query, memory addressing, API call, or other data store/memory access. In some embodiments, the smart sampling algorithm library 106 includes any number of sampling algorithms, such as validation-based sampling, stratified random sampling, simple random sampling, local pivotal method, modified local pivotal method or other inclusion probability-based method, among others or any combination thereof.

In some embodiments, each smart sampling algorithm in the smart sampling algorithm library 106 may include predefined specifications of smart sampling configurations for which each smart sampling algorithm is optimal. Each respective smart sampling algorithm may be indexed according to the particular values of particular inputs of the smart sampling configuration 123 that are associated with the respective smart sampling algorithm. Thus, each smart sampling algorithm may be correlated with the particular inputs for the smart sampling configuration 123, including the size of the dataset, a selection of the target feature(s), a size of the sample, and/or selection(s) for parameters and/or input-dependent selections/parameters, such as target resource use and/or constraints thereof. For example, stratified random sampling has a medium to low compute time and can be used without a target feature, while a local pivotal method-based sampling algorithm and/or a validation-based sampling algorithm may have a higher compute time and may be used with or without target feature(s). Thus, the smart sampling algorithm selection engine 104 may reference the specifications of each smart sampling algorithm in the smart sampling algorithm 108 to determine one or more matching smart sampling algorithms to the smart sampling configuration 123.

In some embodiments, the smart sampling algorithm selection engine 104 may select a smart sampling algorithm from amongst the matching smart sampling algorithms, e.g., based on the smart sampling algorithm having the most matching configuration parameters, according to a predefined order of priority, or a combination thereof. In some embodiments, some configuration parameters may be given priority over others. For example, computation time may be a priority such that where multiple smart sampling algorithms match the smart sampling configuration 123, the smart sampling algorithm selection engine 104 may select the smart sampling algorithm having the lowest compute time.

In some embodiments, the smart sampling algorithm selection engine 104 may return to the computing device 120 user interface, via the data interface 102, the matching smart sampling algorithms. Thus, the user may interact with the user interface on the computing device 120 to manually select the smart sampling algorithm 108. In some embodiments, the smart sampling algorithm selection engine 104 may return to the user interface all available smart sampling algorithms in the smart sampling algorithm library 106 for manual selection by the user of the smart sampling algorithm.

In some embodiments, the smart sampling algorithm selection engine 104 may automatically select the smart sampling algorithm 108 using one or more machine learning models based on the smart sampling configuration 123 and/or historical user sample requests as input. In some embodiments, the smart sampling algorithm selection engine 104 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments, an exemplary neutral network technique may be one of, without limitation, large language model (LLM), feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
 a. define Neural Network architecture/model,
 b. transfer the input data to the exemplary neural network model,
 c. train the exemplary model incrementally,
 d. determine the accuracy for a specific number of timesteps, e. apply the exemplary trained model to process the newly-received input data, f. optionally and in parallel, continue to train the exemplary trained model with a predetermined periodicity.

In some embodiments, a trained neural network model of the smart sampling algorithm selection engine 104 may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments, an output of the exemplary aggregation function of the smart sampling algorithm selection engine 104 may be used as input to the exemplary activation function. In some embodiments, the bias may be a constant value or function that may be used by the aggregation function and/or the activation function to make the node more or less likely to be activated.

In some embodiments, the smart sampling algorithm selection engine 104 may be trained to associate the sample request 122 to the smart sampling algorithm 108 based on historical user-specific or global behaviors including historical selections of one or more of the smart sampling algorithms in the smart sampling algorithm library 106. In some embodiments, the parameters of the machine learning model of the smart sampling algorithm selection engine 104 may be trained based on known outputs, where the parameters including, e.g., action function weights, parameters and/or hyperparameters, node weights, aggregation function weights, parameters and/or hyperparameters, bias value/function, among other tunable aspects of the machine learning model. For example, the sample request 122 may be paired with a target value or known value to form a training pair, such as a historical sample request 122 and an observed result and/or human annotated value representing a data point in the relationship between the historical sample request 122 and the smart sampling algorithm 108. In some embodiments, the sample request 122 may be provided to the machine learning model of the smart sampling algorithm selection engine 104, e.g., encoded in a feature vector, to produce a predicted output value. In some embodiments, an optimizer associated with the machine learning model of the smart sampling algorithm selection engine 104 may then compare the predicted output value with the known output of a training pair including the historical sample request 122 to determine an error of the predicted output value. In some embodiments, the optimizer may employ a loss function, such as, e.g., Hinge Loss, Multi-class SVM Loss, Cross Entropy Loss, Negative Log Likelihood, or other suitable classification loss function to determine the error of the predicted output value based on the known output.

In some embodiments, the known output may be obtained after the machine learning model of the smart sampling algorithm selection engine 104 produces the prediction, such as in online learning scenarios. In such a scenario, the machine learning model of the smart sampling algorithm selection engine 104 may receive the sample request 122 and generate the model output vector to produce an output value representing the smart sampling algorithm 108. Subsequently, a user may provide feedback by, e.g., modifying, adjusting, removing, and/or verifying the output value via a suitable feedback mechanism, such as the user interface device (e.g., keyboard, mouse, touch screen, user interface, or other interface mechanism of a user device or any suitable combination thereof). The feedback may be paired with the sample request 122 to form the training pair and the optimizer may determine an error of the predicted output value using the feedback.

In some embodiments, based on the error, the optimizer may update the parameters of the machine learning model of the smart sampling algorithm selection engine 104 using a suitable training algorithm such as, e.g., backpropagation for a prediction machine learning model. In some embodiments, backpropagation may include any suitable minimization algorithm such as a gradient method of the loss function with respect to the weights of the prediction machine learning model. Examples of suitable gradient methods include, e.g., stochastic gradient descent, batch gradient descent, mini-batch gradient descent, or other suitable gradient descent technique. As a result, the optimizer may update the parameters of the machine learning model of the smart sampling algorithm selection engine 104 based on the error of predicted labels in order to train the machine learning model of the smart sampling algorithm selection engine 104 to model the correlation between sample request 122 and the smart sampling algorithm 108 in order to produce more accurate output values based on sample request 122.

In some embodiments, the smart sampling engine 110 may receive the smart sampling algorithm 108 from the smart sampling algorithm selection engine 104. The smart sampling engine 110 may also receive items from the smart sampling configuration 123 and/or the sample request 122 for input into the smart sampling algorithm 108. For example, the input of the smart sampling algorithm 108 may be the dataset to be sample and the size of sample to be produced, thus defining which data points to sample from and how many to sample. In some embodiments, the input may also include the target feature(s). In some embodiments, sampling a large dataset may result in a sample that does not represent the dataset or any particular aspect of the dataset. In order to allow the user to define what aspect of the dataset that the smart sampled dataset 124 is desired to represent, the smart sampling engine 110 may use the target feature(s) as input to define what aspect(s) of the data that the smart sampled dataset 124 is to represent. For example, in a dataset concerning a large population of people, the target feature(s) may include a particular age range, gender, pre-existing condition, or other characteristic or any combination thereof, including, e.g., KPI, key features, most relevant features to an application of the dataset, etc., such that the smart sampling engine 110 configures the smart sampling algorithm 108 to produce the smart sampled dataset 124 based on the target feature(s). For example, the smart sampling engine 110 may increase the weight of the target feature(s) relative to other features of the data in the dataset or may remove the other features entirely from analysis by the smart sampling algorithm 108.

In some embodiments, the smart sampling engine 110 may instantiate one or more programs for implementing the smart sampling algorithm 108 to perform the sampling based on the inputs via local, remote and/or cloud-based compute architecture, e.g., on bare metal, in a container, in a virtual machine, in a sandbox, high performance compute cluster (Apache Spark™ or other analytics engine or any combination thereof) or via any other suitable resource provisioning technology or any combination thereof.

In some embodiments, the term "container" refers to an entire runtime environment: an application, plus all its dependencies, libraries and other binaries, and configuration files needed to run the application, bundled into one package. By containerizing the application platform and its dependencies, differences in OS distributions and underlying infrastructure are abstracted away.

As used herein, the terms "virtual machine (VM)" identifies at least one software component and/or a combination of at least one software component and at least one hardware component which are designed/programmed/configured to virtually emulate physical computer systems, such as, e.g., system virtual machines that provide a virtualization of a physical machine, a process virtual machine that is designed to execute computer programs in a virtual environment, or other duplication of real computing systems in a virtual environment.

As used herein, the term "sandbox" identifies at least one software component and/or a combination of at least one software component and at least one hardware component which are designed/programmed/configured to manage/control untested and untrusted programs or code from, e.g., unverified, untrusted third parties, suppliers, users and/or websites, without risking harm to a host machine, such as a computing device, mobile computing device, server, cloud platform, or other devices and/or systems. As used herein, the term "sandbox" may include virtualization techniques to separate a program and or code from the host system to mitigate system failures and/or software vulnerabilities to prevent the program and/or code from harming the host system and/or device.

Accordingly, in some embodiments, the smart sampling engine 110 may sample the dataset using the smart sampling algorithm 108 and the inputs to produce the smart sampled dataset 124.

Figure 3:
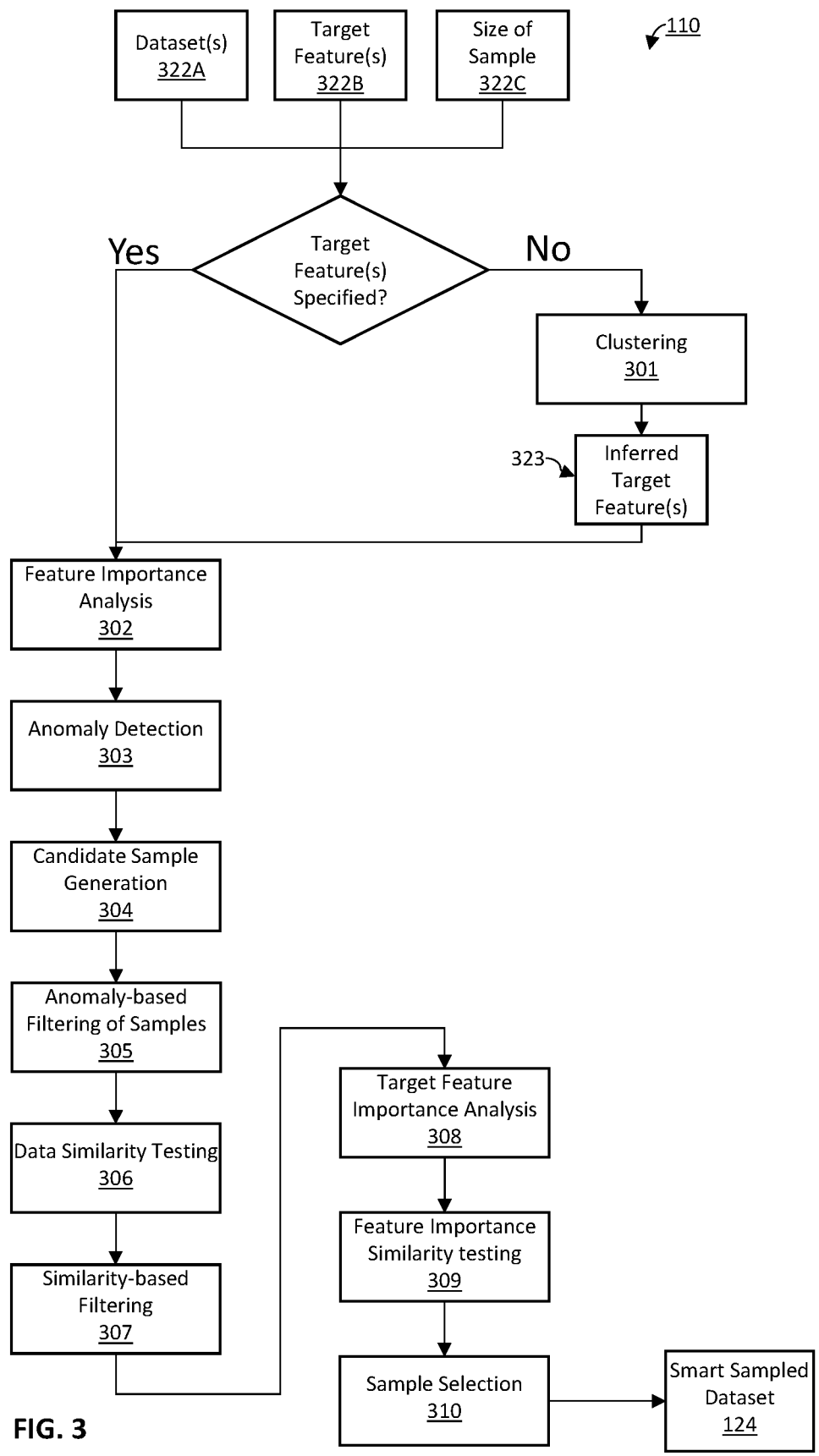
FIG. 3 is a block diagram of an exemplary computer-based system for smart dataset sampling using validation-based sampling in accordance with one or more embodiments of the present disclosure.

Referring to FIG. 3, a block diagram of an exemplary computer-based system for smart sampling using validation-based sampling is illustrated in accordance with one or more embodiments of the present disclosure.

In some embodiments, the smart sampling algorithm 108 may include a validation-based smart sampling algorithm. Accordingly, the smart sampling algorithm 108 may cause the smart sampling engine 110 to ingest as input the dataset 322A of the sample request 122, the size of the sample 322C and any the target feature(s) 322B specified by the user. In some embodiments, the user may omit target feature(s) 322B. In some embodiments, the validation-based smart sampling algorithm may use the dataset(s) 322A, target feature(s) 322B and/or the size of the sample 322C to sample the dataset(s) 322A by picking several uniform random samples and analyze the properties of each uniform random sample to determine "best" one as determined by machine learning routines and one or more test statistics for distribution similarity between each sample and the dataset(s) 322A.

In some embodiments, where target feature(s) 322B are omitted, the validation-based smart sampling algorithm may automatically generate one or more inferred target features. To do so, in some embodiments, the validation-based smart sampling algorithm may perform clustering 301 on the dataset(s) 322A.

In some embodiments, the clustering 301 may include preprocessing the dataset(s) 322A, to, e.g., ensure common formatting, fill empty data fields/values, ensure data quality, among other operations or any combination thereof.

In some embodiments, cleansing and normalizing operations may include, e.g., removing low quality features from the dataset as defined by a number of data points having missing/non-missing fields and/or values for a given feature. For example, if a missing/non-missing threshold, e.g., 60%, 65%, 70%, 75%, 80%, 85%, 90%, 95%, 97%, 98%, 99%, 99.5% or other missing/non-missing threshold of data points have non-missing values for a particular feature, then the feature is considered a "good" or "high quality" feature. In some embodiments, the missing/non-missing threshold may instead or in addition be a top K number of features according to amount of non-missing values across data points, where K may be, e.g., 2, 3, 4, 3, 6, 7, 8, 9, 10, 11, 12, 13, 14, 15, 16, 17, 18, 19, 20, etc. In some embodiments, the high-quality or good features may remain while the remainder of features may be cleansed from the dataset(s) 322A by removing the remainder of features from each data point.

In some embodiments, cleansing and normalizing operations may include, e.g., using an imputer (e.g., mean, median, weighted mean, etc.) to fill blank or "not-a-number" (NaN) values. If data points with missing values are removed, the dataset(s) 322A could end up with an empty data frame or if those data points are removed only for fitting the clustering model, those data points would not be clustered or improperly clustered. Indeed, values are needed to make predictions on the data points.

In some embodiments, the dataset(s) 322A may include features having categorical data as opposed to numerical values. Clustering data based on categorical data, or a mix of categorical data and numerical values may be difficult. Thus, the categorical data may be transformed into numerical data using an encoding technique. For example, the categorical data may be one-hot encoded. In some embodiments, one-hot encoding can include one-hot encoding for each category of the categorical data. However, in some embodiments, similar to the one-hot encoding of the Smart Mapping technique for feature importance analysis 302 as is further detailed below, the most frequently occurring categories in the data may be one-hot encoded (e.g., the top 2, 3, 4, 3, 6, 7, 8, 9, 10, etc. most frequent categories), and the remaining categories encoded as, e.g., "other". Additionally, or alternatively, other encoding techniques may be employed, such as ordinal encoding.

In some embodiments, data points having one or more field(s) with missing categorical data may be pre-processed to remove the field(s), remove the data points, impute a most frequent category from the dataset(s) 322A for the field(s), apply an "other" or "missing" category to the field(s), or any other pre-processing to address missing categorical data, or any combination thereof.

In some embodiments, such operations may include, e.g., adding a new feature to each data point that holds a vector to be used as input for the clustering algorithm. In some embodiments, the vector may be a vectorization of the features of the data point, including any cleansed and/or normalized fields/values. In some embodiments, where the target feature(s) 322B are not provided, the vector feature may be a vectorization of the fields/values of all remaining features of each data point after pre-processing.

In some embodiments, the clustering 301 may include, e.g., K-Means or K-Means++, K-nearest neighbor, DBSCAN, HDBSCAN, fuzzy clustering, spectral clustering or other clustering algorithm or any combination thereof. In some embodiments, where K-means or K-means++ clustering is used, the number of clusters may be, e.g., an input-dependent selection/parameter of the smart sampling configuration 123, an algorithm or rules-based number based on, e.g., the size of the dataset(s) 322A and/or the size of the sample 322C, or other technique for setting K. For example, in some embodiments, K may be set as a function of the size(s) of the dataset(s) 322A, such as, e.g., square_root(s), cube_root(s), fourth_root(s), s divided by the size of the sample, or other suitable function or any combination thereof.

In some embodiments, the clustering 301 may automatically label each cluster, e.g., based on a region in space, a predominant feature around which the data points are clustered, or a generic cluster label to identify the cluster, or any combination thereof. In some embodiments, the label of each cluster may be used as an inferred target feature(s) 323 for the sampling. Thus, the validation-based sampling algorithm may perform sampling based on representing the data points of each of the clusters from the clustering 301.

In some embodiments, the target feature(s), whether the input target feature(s) 322B or the inferred target feature(s) 323 may be analyzed via feature importance analysis 302. Feature importance refers to techniques that calculate a score for all the input features for a given model, where the scores represent the "importance" of each feature on the behavior of the target feature(s) 322B/323. A higher score means that the specific feature is correlated with a larger effect on the target feature(s) 322B/323.

In some embodiments, the feature importance analysis 302 determines the importance of each target feature using a feature importance algorithm. In some embodiments, the feature importance algorithm may include, e.g., permutation feature importance, coefficients as feature importance, decision tree feature importance, among others.

For example, feature importance analysis 302 may include Smart Mapping according to U.S. Pat. No. 11,455,759, which is incorporated herein by reference in its entirety. In some embodiments, Smart Mapping may include, e.g., in categorical features, transforming string values into integers. In some embodiments, the most frequent categories (e.g., the 3, 4, 5, 6, 7, 8, 9, 10, etc. most frequent categories) are kept, and all remaining categories are transformed into a single "Other" category. In some embodiments, each category may be expanded into one-hot encoded features.

In some embodiments, in order to improve the efficiency of the Smart Mapping process, the training dataset may be sampled to form a training sample. Thus, an upper limit of data points for training may be established to ensure a maximum computation time. For example, using the one-hot encoded features, a training sample may be created from the original dataset such that, if the original dataset has size N, the training sample may have size min (50*sqrt (N), 5*10**6). For example, for 100,000,000 data points in the dataset(s) 322A, the training sample may have a size of, e.g., 500,000. In some embodiments, if the target feature is numeric, the target feature may be discretized or binned into multiple buckets according to a predefined bucketing configuration. In some embodiments, the buckets may each have equal size, or may be unequally sized. In some embodiments, the bucketing configuration may set the bucket size based on the training sample size, such as, e.g., if the training sample has size greater than or equal to a predefined threshold (e.g., 100, 200, 300, 320, 340, 360, 380, 400, etc.), the number of buckets is a first number (e.g., 2, 3, 4, 5, 6, 7, 8, 9, 10, etc.), otherwise it is a second number (e.g., 1, 2, 3, 4, 5, 6, 7, 8, 9, etc.). In some embodiments, a random forest classifier may be trained on the training sample. The random forest classifier may then be applied to return a feature importance score for each feature that is indicative of an importance of each feature in the behavior of the target feature(s) 322B/323.

In some embodiments, the feature importance analysis 302 may record the features with top feature absolute importances, e.g., top 2, top 3, top 4, top 5, top 6, top 7, top 8, top 9, top 10 or more target features based on the feature importances. Alternatively, or in addition, the feature importance analysis 302 may record the features with top relative feature importances, e.g., top 1%, top 2%, top 3%, top 4%, top 5%, top 6%, top 7%, top 8%, top 9%, top 10% or more of target features based on the feature importances.

In some embodiments, the validation-based smart sampling algorithm may then be configured to perform anomaly detection 303. In some embodiments, anomaly detection 303 may identify a threshold percent of anomalous data points in the dataset(s) 322A based on the features having the highest importance score. In some embodiments, the anomaly detection 303 may employ one or more anomaly detection algorithms to detect anomalous data points based on the target feature(s) 322B/323. For example, the anomaly detection algorithm may include, e.g., statistical (Z-score, average Z-score, Tukey's range test and Grubbs's test), density-based techniques (k-nearest neighbor, local outlier factor, isolation forests, and many more variations of this concept), subspace-, correlation-based and tensor-based outlier detection for high-dimensional data, one-class support vector machines, replicator neural networks, autoencoders, variational autoencoders, long short-term memory neural networks, Bayesian networks, Hidden Markov models (HMMs), Minimum Covariance Determinant, cluster analysis-based outlier detection, deviations from association rules and frequent item sets, fuzzy logic-based outlier detection, ensemble techniques, using feature bagging, score normalization and different sources of diversity, among others or any combination thereof.

For example, the anomaly detection 303 may utilize a probability distribution-based algorithm to identify unlikely and therefore anomalous data points. A probability distribution may be generated across the data points. The probability distribution may represent the values of the data points, such as, e.g., values of a particular feature, values of each of the features having the highest feature importances, an aggregate of the features of each data point, an aggregate of the highest feature importances of each data point, or other representation of the probability distribution(s) for the dataset(s) 322A. The probability distribution may be defined by, e.g., a mean and standard deviation, a median and standard deviation, a normal distribution, a Gaussian distribution, among others or a combination thereof.

In some embodiments, for each data point, the anomaly detection 303 may calculate the absolute value of the standardized distance from the center of the probability distribution (e.g., from the mean, median, etc.) for each of the features having the highest importance score. For example, for a value of v in a feature with corresponding, e.g., median value m and standard deviation s, the standardized distance may be abs (v-m)/s. The anomaly detection 303 may then, for each datapoint, take the average of all standardized distances across all of the features having the highest importance score.

In some embodiments, anomalous data points may then be identified based on an anomalous threshold. The anomalous threshold value may be a magnitude of the averaged standardized difference of each data point, a position in a ranking of the averaged standardized distances, a percentile of the averaged standardized differences, or other suitable thresholding metric. For example, the anomalous threshold may be, e.g., 1% percentile of the averaged standardized distances, 2% percentile of the averaged standardized distances, 3% percentile of the averaged standardized distances, 3% percentile of the averaged standardized distances, 4% percentile of the averaged standardized distances, 5% percentile of the averaged standardized distances, or other percentile or any combination thereof. denote this value as the anomalous threshold. Each data point may be assigned as anomalous or non-anomalous based on its averaged standardized distance being above or below the anomalous threshold.

In some embodiments, candidate sample generation 304 may be performed on the dataset(s) 322A to form candidate samples, which may then be tested. In some embodiments, the candidate sample generation 304 may include a sampling technique such as, e.g., simple random sampling, uniform random sampling, stratified random sampling, LPM-based sampling, validation-based sampling (e.g., the validation-based smart sampling algorithm recursively applied via the candidate sample generation 304), or other sampling technique or any combination thereof. In some embodiments, the candidate sample generation 304 may include the stratified random sampling detailed below with respect to FIG. 5, or may include a different configuration for stratified random sampling. Similarly, in some embodiments, the candidate sample generation 304 may include the LPM-based smart sampling detailed below with respect to FIG. 4, or may include another LPM-based sampling configuration. In some embodiments, the candidate sample generation 304 may be configured to generate a predetermined number of candidate samples, such as, e.g., 5, 10, 15, 20, 25, 30, or more candidate samples. In some embodiments, the number of candidate samples may be, e.g., a predefined parameter or an input-dependent selection/parameter of the smart sampling configuration 123, an algorithm or rules-based number based on, e.g., the size of the dataset(s) 322A and/or the size of the sample 322C, or other technique for setting the number of candidate samples. For example, in some embodiments, the number of candidate samples may be set as a function of the size(s) of the dataset(s) 322A, such as, e.g., square_root(s), cube_root(s), fourth_root(s), s divided by the size of the sample, or other suitable function or any combination thereof. In another example, the size of the candidate samples being generated may be preset at the size of the sample 322C so as to produce candidate samples that match the size of the sample 322C specified in the smart sampling configuration 123.

For example, the candidate sample generation 304 may generation, e.g., 5, 10, 15, 20, 25, 30, or more uniform random samples, where each sample has a size in a range of, e.g., 10,000 to 10,000,000 datapoints, such as 100,000, 200,000, 300,000, 400,000, 500,000, 600,000, 700,000, 800,000, 900,000, 1,000,000, 1,100,000, 1,200,000, 1,300,000, 1,400,000, 1,500,000 data points or more.

In some embodiments, the validation-based smart sampling algorithm may include anomaly-based filtering of candidate samples 305. In some embodiments, the anomalous threshold may be used to define one or more anomaly filtering criteria to filter the candidate samples. The anomaly filtering criteria may be a predefined number of anomalous data points as per the anomaly detection 303. The predefined number may be, e.g., a magnitude defining a number of anomalous data points in a given cluster, a percentage defining a percent of anomalous data points relative to total data points in a given cluster, a percentage defining a percent of anomalous data points in a given cluster relative to total data points in the dataset(s) 322A, a location in a rank ordering of the clusters based on the number or percentage of anomalous data points in each cluster, a percentile relative to all clusters based on the number or percentage of anomalous data points in each cluster, among other anomaly filtering criteria.

In some embodiments, the anomaly filtering criteria may be based on the anomalous threshold. For example, the anomaly filtering criteria may be a band around the value of the anomalous threshold, the band having an upper bound, such as, e.g., 0.10% above the anomalous threshold, 0.15% above the anomalous threshold, 0.20% above the anomalous threshold, 0.25% above the anomalous threshold, 0.30% above the anomalous threshold, 0.35% above the anomalous threshold, 0.40% above the anomalous threshold, 0.45% above the anomalous threshold, 0.50% above the anomalous threshold, 0.55% above the anomalous threshold, or greater. For example, the anomaly filtering criteria may be a band around the value of the anomalous threshold, the band having a lower bound, such as, e.g., 0.10% below the anomalous threshold, 0.15% below the anomalous threshold, 0.20% below the anomalous threshold, 0.25% below the anomalous threshold, 0.30% below the anomalous threshold, 0.35% below the anomalous threshold, 0.40% below the anomalous threshold, 0.45% below the anomalous threshold, 0.50% below the anomalous threshold, 0.55% below the anomalous threshold, or greater. In some embodiments, the upper bound and the lower bound may be the same or different.

In some embodiments, the anomaly-based filtering of the candidate samples 305 may apply the anomaly filtering criteria to each candidate sample, and for each candidate sample having an amount of anomalous data points that meet and/or exceed the anomaly filtering criteria, the candidate sample may be removed.

In some embodiments, for the remaining candidate samples after anomaly-based filtering, the validation-based smart sampling algorithm may perform data similarity testing 306 to test the similarity of each candidate sample to the dataset(s) 322A. To do so, the data similarity testing 306 may produce a sample distribution representative of the distribution of one or more of the features in a given sample and compare the sample distribution to a dataset(s) 322A distribution that represents the distribution of the same features in the dataset(s) 322A. In some embodiments, the sample distribution and/or the dataset(s) 322A distribution may be based on the target feature(s) 322B/323, the features having the greatest feature importance to the behavior of the target feature(s) 322B/323, on all features, or on another set of the features of each data point or any combination thereof.

In some embodiments, the data similarity testing 306 may use, e.g., an approximation based method using quantile sketches to approximate the cumulative density function (CDF) so as to generate the sample distribution and/or target distribution while avoiding sorting. In some embodiments, the approximation based method using quantile sketches may include a Greenwald-Khanna quantile estimator, moment-based quantile sketches, or other approximation based approaches or any combination thereof.

In some embodiments, the data similarity testing 306 may use a test statistic to evaluate the similarity between the sample distribution of a particular sample and the target distribution. In some embodiments, the test statistic may include, e.g., Kolmogorov-Smirnov (KS), Anderson-Darling, chi-squared, t-score, p-score, z-score, or other test statistic or any combination thereof.

In addition, or alternatively, in some embodiments, the data similarity testing 306 may repeatedly calculate a 2 sample test statistic between a target uniform random sample and a new random sample taken from the original data points from the dataset until a confidence interval of the true value of the statistic decreases to below a confidence interval threshold, such as, e.g., a 90% confidence interval threshold, a 95% confidence interval threshold, a 96% confidence interval threshold, 97% confidence interval threshold, 98% confidence interval threshold, 99% confidence interval threshold, 99.5% confidence interval threshold, or other threshold.

In some embodiments, using the data similarity testing 306, e.g., the calculated test statistics for each candidate sample, the validation-based smart sampling algorithm may perform similarity-based filtering 307. In some embodiments, the similarity-based filtering 307 may filter samples which have an average probability of belonging to the original dataset that exceeds a probability criterion. In some embodiments, the probability criterion may be, e.g., 80% or greater, 85% or greater, 90% or greater, 95% or greater, 96% or greater, 97% or greater, 98% or greater, 99% or greater, 99.5% or greater, etc.

In some embodiments, as the number of features per data point increases, the likelihood of any candidate sample reaching probability criterion approaches 0. Thus, to accommodate dataset(s) 322A having a large number of features, the probability criterion may be percentile based. Thus, the relative performance of each candidate cluster may be calculated as a percentile of the population of candidate samples based on the calculated similarity of each candidate sample. The probability criterion may thus define a threshold percentile to which any given candidate sample must belong in order to remain, while those that do not satisfy the threshold percentile are discarded. In some embodiments, the threshold percentile may be, e.g., top 5% of performant samples, top 6%, top 7%, top 8%, top 9%, top 10%, top 11%, top 12%, top 13%, top 14%, top 15%, or greater.

In some embodiments, the remaining candidate samples after similarity-based filtering 307 may be assessed for target feature importance analysis 308. The target feature importance analysis 308 may assess feature importance on remaining candidate samples to identify candidate samples having the aggregate feature importances similar to that of the dataset(s) 322A.

For example, similar to the feature importance analysis 302, the target feature importance analysis 308 may include Smart Mapping according to U.S. Pat. No. 11,455,759 as incorporated above. In some embodiments, Smart Mapping may include, e.g., in categorical features, transform string values into integers. In some embodiments, the most frequent categories (e.g., the 3, 4, 5, 6, 7, 8, 9, 10, etc. most frequent categories) are kept, and all remaining categories are transformed into a single "Other" category. In some embodiments, each category may be expanded into one-hot encoded features. In some embodiments, using the one-hot encoded features, a training candidate subsample may be created from each candidate sample such that, if the respective candidate sample has size N, the training candidate subsample may have size min (50*sqrt (N), 5*106). For example, for 100,000,000 data points in the dataset(s) 322A**, the training candidate subsample may have a size of, e.g., 500,000. In some embodiments, if the target feature is numeric, the target feature may be discretized or binned into multiple buckets according to a predefined bucketing configuration. In some embodiments, the buckets may each have equal size, or may be unequally sized. In some embodiments, the bucketing configuration may set the bucket size based on the training candidate subsample size, such as, e.g., if the training candidate subsample has size greater than or equal to a predefined threshold (e.g., 100, 200, 300, 320, 340, 360, 380, 400, etc.), the number of buckets is a first number (e.g., 2, 3, 4, 5, 6, 7, 8, 9, 10, etc.), otherwise it is a second number (e.g., 1, 2, 3, 4, 5, 6, 7, 8, 9, etc.). In some embodiments, a random forest classifier may be trained on the training candidate subsample for each candidate sample. The random forest classifier may then be applied to the respective candidate sample for which it was trained to return feature importance scores indicative of an importance of each feature in optimizing for the target features of each candidate sample.

In some embodiments, the target feature importance analysis 308 may record the features with top feature absolute importance scores, e.g., top 2, top 3, top 4, top 5, top 6, top 7, top 8, top 9, top 10 or more target features based on the feature importance scores for each candidate sample. Alternatively, or in addition, the target feature importance analysis 308 may record the features with top relative feature importance scores, e.g., top 1%, top 2%, top 3%, top 4%, top 5%, top 6%, top 7%, top 8%, top 9%, top 10% or more of target features based on the feature importance scores for each candidate sample.

In some embodiments, upon evaluating the feature importance of each target feature(s) 322A/323 in each of the remaining candidate samples, the validation-based smart sampling algorithm may perform feature importance similarity testing 309. In some embodiments, the feature importance similarity testing 309 may include calculating a similarity measurement of the feature importance of each target feature(s) 322B/323 in each of the remaining candidate samples to the feature importance score of each target feature 322B/323 in the dataset(s) 322A.

In some embodiments, similarity may be formulated as a point system where a point is added for each feature in the sample's top feature importances (e.g., top 2, 3, 4, 5, 6, 7, 8, 9, 10 or more features) belonging to the original dataset's top feature importances (e.g., top 2, 3, 4, 5, 6, 7, 8, 9, 10 or more features).

In some embodiments, similarity may be formulated via a similarity measurement between the top features according to feature importance score for the dataset(s) 322A and the top features according to feature importance score for each sample, where a higher correlation coefficient is more positive. In some embodiments, the similarity measurement of each candidate sample to the dataset may be measured according to a measure of similarity of individual or combinations of the important features of each candidate sample and the dataset(s) 322A. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the features included in the set of top feature importance scores of each candidate sample measured against the features included in the set of top feature importance scores of the dataset(s) 322A.

In some embodiments, the similarity may be measured based on a candidate sample vectorization of the features included in the set of top feature importance scores of each candidate sample and a dataset vectorization of features included in the set of top feature importance scores of the dataset(s) 322A. Thus, the similarity of each candidate sample vectorization may be measured against the dataset vectorization by inputting the data vectorization and a particular candidate sample vectorization into the similarity measure to determine a particular similarity score for a particular candidate sample.

In some embodiments, the candidate samples may be ranked according to similarity. For example, in the point system, the candidate samples can be ranked in descending order by the highest number of points, breaking ties by higher correlation coefficient. In some embodiments, for the similarity score, the candidate samples can be ranked in descending order by the similarity score.

In some embodiments, the validation-based smart sampling algorithm may then perform sample selection 310. Sample selection 310 may select the most similar candidate sample(s). For example, sample selection 310 may include selecting the highest ranked candidate sample, a predetermined number of highest ranked candidate samples (e.g., 2, 3, 4, 5, 6, 7, 8, 9, 10, etc.), a number of the highest ranked candidate samples to achieve the size of the sample 322C, among other sample selection methodologies or any combination thereof. As a result, the validation-based smart sampling algorithm may output a set of data points associated with the selected candidate samples to form the smart sampled dataset 124.

Figure 4:
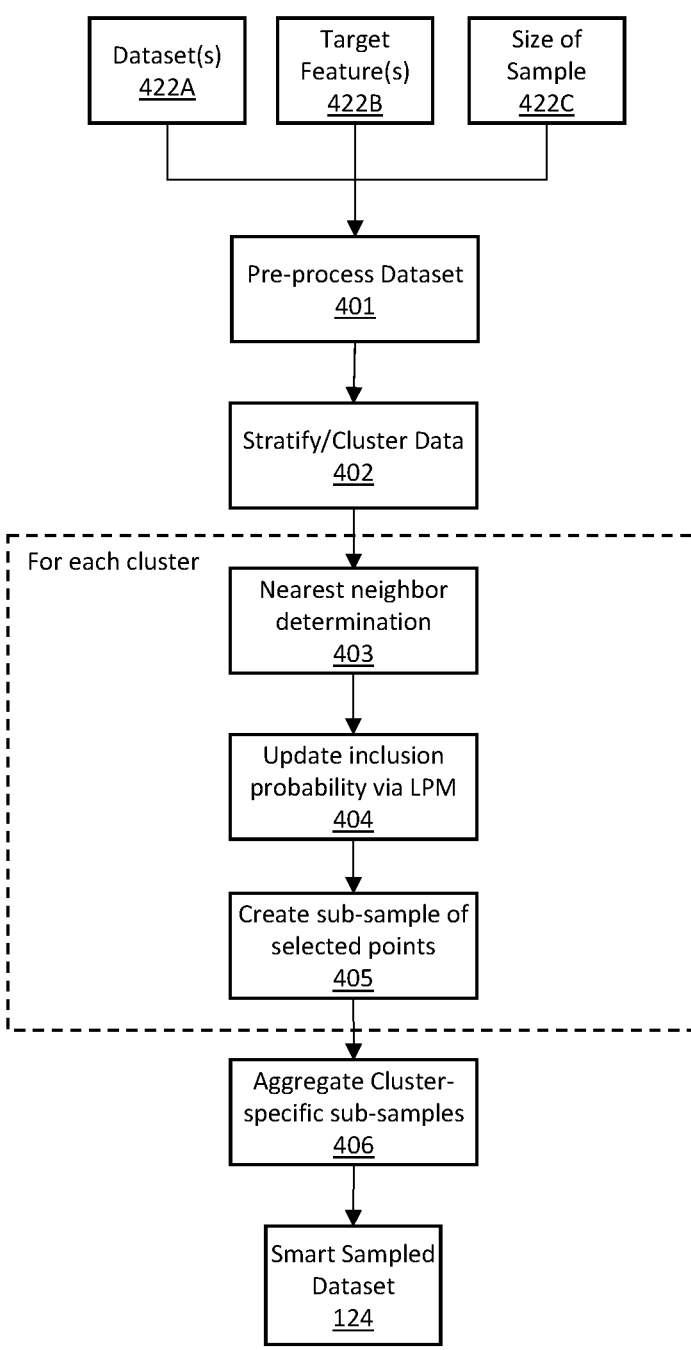
FIG. 4 is a block diagram of an exemplary computer-based system for smart dataset sampling using inclusion probability-based sampling in accordance with one or more embodiments of the present disclosure.

Referring to FIG. 4, a block diagram of an exemplary computer-based system for smart sample using inclusion probability-based sampling is illustrated in accordance with one or more embodiments of the present disclosure.

In some embodiments, the smart sampling algorithm 108 may include an inclusion probability-based random sampling algorithm, such as a local pivotal method (LPM) based smart sampling algorithm. Accordingly, the smart sampling algorithm 108 may cause the smart sampling engine 110 to ingest as input the dataset 422A of the sample request 122, the size of the sample 422C and any the target feature(s) 422B specified by the user. In some embodiments, the user may omit target feature(s) 422B.

In some embodiments, LPM provides a way to create spatially balanced samples by aggregating inclusion probabilities from neighboring points, lowering the chance that adjacent points are sampled together. Generally, LPM can be represented according to the following equation:

$$B = \sum_{i \in S} \left( -1 + \sum_{j \in N_i} \pi_j \right)^2$$

$S$ = sample of size $n$ from a population $\mathcal{U}$ of size $N$;

$N_i$ = spatial neighborhood (*Voronoi tessellation* about sampled point $i$);

$\pi_i = Pr(i \in C)$, the first order inclusion probability in sample $S \subset \mathcal{U}$.

Necessarily, $\sum_{i \in \mathcal{U}} \pi_i = n$ and $1 \geq \pi_i < 0 \forall i \in \mathcal{U}$.

Indeed, LPM may be performed according to Algorithm 1 below where initial inclusion probabilities $\pi_i$ are all equal:

Algorithm 1 LPM2 Algorithm.

1: while length ($\mathcal{U}^*$) > 0 do
2:     Randomly select sampling unit i ∈ $\mathcal{U}^*$ with uniform probability.
3:     Set j to the nearest-neighbor of i in $\mathcal{U}^*$.
4:     Set $(\pi_i, \pi_j) := g(\pi_i, \pi_j)$.
5:     Set $\mathcal{U}^* := \mathcal{U}^* \setminus \{k \in \{i, j\} : \pi_k \in \{0, 1\}\}$.
6: end while when $\pi_i + \pi_j > 1$    $g(i, j) = \begin{cases} (0, \pi_i + \pi_j) & \text{with probability} \dfrac{\pi_j}{\pi_i + \pi_j} \\ (\pi_i + \pi_j, 0) & \text{else} \end{cases}$ otherwise    $g(i, j) = \begin{cases} (1, \pi_i + \pi_j - 1) & \text{with probability} \dfrac{1 - \pi_j}{2 - \pi_i + \pi_j} \\ (\pi_i + \pi_j - 1, 1) & \text{else} \end{cases}$ Therefore, runtime within loop is dominated by finding the nearest neighbor of unit i. Total runtime is $\mathcal{O}(\mathcal{N}^2)$. Accordingly, in some embodiments, LPM may utilize compute resources in excess of what is available to sample the dataset(s) 422A. Thus, to improve the efficiency of LPM, the LPM-based smart sampling algorithm may implement technologies such as efficient clustering, including, e.g., using k-nearest neighbor analysis for finding nearest neighbors, such as with KD-Trees, among other efficiency boosting techniques.

Thus, in some embodiments, the LPM-based smart sampling algorithm may preprocess dataset 401 to prepare the dataset(s) 422A for clustering. In some embodiments, preprocessing the dataset may include operations for cleansing and normalizing the data points in the dataset(s) 422A, such as, e.g., ensuring common formatting, filling empty data fields/values, ensuring data quality, among other operations or any combination thereof.

In some embodiments, cleansing and normalizing operations may include, e.g., removing low quality features from the dataset as defined by a number of data points having missing/non-missing fields and/or values for a given feature. For example, if a missing/non-missing threshold, e.g., 60%, 65%, 70%, 75%, 80%, 85%, 90%, 95%, 97%, 98%, 99%, 99.5% or other missing/non-missing threshold of data points have non-missing values for a particular feature, then the feature is considered a "good" or "high quality" feature. In some embodiments, the missing/non-missing threshold may instead or in addition be a top K number of features according to amount of non-missing values across data points, where K may be, e.g., 2, 3, 4, 5, 6, 7, 8, 9, 10, 11, 12, 13, 14, 15, 16, 17, 18, 19, 20, etc. In some embodiments, the high-quality or "good" features may remain while the remainder of features may be cleansed from the dataset(s) 422A by remove the remainder of features from each data point.

In some embodiments, cleansing and normalizing operations may include, e.g., using an imputer (e.g., mean, median, weighted mean, etc.) to fill blank or "not-a-number" (NaN) values. If data points with missing values are removed, the dataset(s) 422A could end up with an empty data frame or if those data points are removed only for fitting the clustering model, those data points would not be clustered or improperly clustered. Indeed, values are needed to make predictions on the data points.

In some embodiments, the dataset(s) 422A may include features having categorical data as opposed to numerical values. Clustering data based on categorical data, or a mix of categorical data and numerical values may be difficult. Thus, the categorical data may be transformed into numerical data using an encoding technique. For example, the categorical data may be one-hot encoded. In some embodiments, one-hot encoding can include one-hot encoding for each category of the categorical data. However, in some embodiments, similar to the one-hot encoding of the Smart Mapping technique for feature importance analysis 302 detailed above with reference to FIG. 3, the most frequently occurring categories in the data may be one-hot encoded (e.g., the top 2, 3, 4, 5, 6, 7, 8, 9, 10, etc. most frequent categories), and the remaining categories encoded as, e.g., "other". Additionally, or alternatively, other encoding techniques may be employed, such as ordinal encoding.

In some embodiments, data points having one or more field(s) with missing categorical data may be pre-processed to remove the field(s), remove the data points, impute a most frequent category from the dataset(s) 422A for the field(s), apply an "other" or "missing" category to the field(s), or any other pre-processing to address missing categorical data, or any combination thereof.

In some embodiments, such operations may include, e.g., adding a new feature to each data point that holds a vector to be used as input for the clustering algorithm. In some embodiments, the vector may be a vectorization of the features of the data point, including any cleansed and/or normalized fields/values. In some embodiments, where the target feature(s) 422B are provided, the vector feature may be a vectorization of the fields/values of the target feature(s) 422B of each data point. In some embodiments, where the target feature(s) 422B are not provided, the vector feature may be a vectorization of the fields/values of all remaining features of each data point after pre-processing.

In some embodiments, using the vector feature of each data point, the LPM-based smart sampling algorithm may stratify/cluster data 402. In some embodiments, the user may define specific stratification criteria, e.g., by defining grouping or filtering criteria that form the stratification. Alternatively, or in addition, in some embodiments, improve sampling representation of the dataset(s) 422A, the LPM-based smart sampling algorithm may use a clustering model to create the stratification. For example, in some embodiments, to stratify/cluster the data 402, the LPM-based smart sampling algorithm may use a clustering algorithm using the vector feature of each data point, such as, e.g., K-Means or K-Means++, K-nearest neighbor, DBSCAN, HDBSCAN, fuzzy clustering, spectral clustering or other clustering algorithm or any combination thereof. In some embodiments, where K-means or K-means++ clustering is used, the number of clusters may be, e.g., an input-dependent selection/parameter of the smart sampling configuration 123, an algorithm or rules-based number based on, e.g., the size of the dataset(s) 422A and/or the size of the sample 422C, or other technique for setting K. For example, in some embodiments, K may be set as a function of the size(s) of the dataset(s) 422A, such as, e.g., square_root(s), cube_root(s), fourth_root(s), s divided by the size of the sample, or other suitable function or any combination thereof.

In some embodiments, an iterative LPM process may performed on each cluster to determine a sub-sample of selected points based on inclusion probability. Thus, in some embodiments, for each cluster, the LPM-based smart sampling method may perform a nearest neighbor determination 403. In some embodiments, at least one technological advantage of generating stratifications via clustering is that the iterative LPM process may performed on each cluster independently, and thus in parallel via parallel execution. As a result, inclusion probabilities and point selection may be performed in less time than would typically be possible.

In some embodiments, the nearest neighbor determination 403 may spatially partition and perform LPM on each partition, e.g., independently and/or with parallel execution. In some embodiments, to further improve the efficiency of the LPM process, determination of nearest neighbors may employ a data structure and/or schema to index data points in the cluster such that nearest neighbors can be efficiently queried.

In some embodiments, such a data structure may include, e.g., one or more K-dimensional trees (KD-trees), binary search trees, among other data structures for efficient searching. In some embodiments, KD-trees are a data structure providing nearest neighbor queries with complexity $\mathcal{O}(\log n)$. In some embodiments, tree construction has complexity $\mathcal{O}(n \log n)$. Thus, in some embodiments, in LPM algorithm, total complexity of tree construction and querying n times brings total is $\mathcal{O}(n \log n)$ which is an improvement on $\mathcal{O}(\mathcal{N}^2)$.

In some embodiments, the KD-tree(s) may partition the space by recursively splitting each node on the median of each feature. Thus, every parent node splits the space into two subspaces based on a certain dimension (e.g., on a certain feature). The splitting splits the space such that every node in its left subtree is in the left subspace, and every node in its right subtree is in the right subspace. The dimension that a node is splitting on depends on which level of the tree this node is in. In some embodiments, in constructing the KD Tree, each node may split the space such that there are an equal number of nodes in the left subspace as the right subspace. Therefore, each parent node may split according to the median among the nodes for the current dimension and make it the subroot. In some embodiments, such a process is exemplified by Algorithm 2 below to construct a leaf-based-KD-Tree of the partition points:

---

Algorithm 2 Algorithm to build a k-d tree for a k-dimensional data set.

1: initialize:
    Index the points in the set $\mathcal{X}$ with $\mathcal{I}$
    i ← 1
2:   procedure KDTREE($\mathcal{I}$,i)
3:   Create new node A, with attributes left, right, median, and data.
4:   if length ($\mathcal{I}$) > m then
5:     Split $\mathcal{I}$ into $\mathcal{I}_l$ and $\mathcal{I}_r$ by the median of dimension i modulo k plus one.
6:     Set A's median to the split point.
7:     Set A's left child to KDTREE($\mathcal{I}_l$,i + 1).
8:     Set A's right child to KDTREE($\mathcal{I}_r$,i + 1).
9:   els Algorithm 2 Algorithm to build a k-d tree for a k-dimensional data set.

10:    Set A's data to $\mathcal{I}$.
11:  end if
12:  return A
13: end procedure In some embodiments, the partition points of the KD-tree may be determined by setting the number of partitions (n_partitions) at which to end the recursive process of splitting nodes. In some embodiments, n_partitions may be set as a default value, e.g., 3, 4, 5, 6, 7, 8, 9, 10, etc. Alternatively, or in addition, n_partitions may be determined based on the size of the clusters, for example to determine a number of data points to assign to each partition. For example, the number of partitions may set as the size of cluster divided by a predetermined value, such as, e.g., 1,000, 2,000, 3,000, 4,000, 5,000, 6,000, 7,000, 8,000, 9,000, 10,000, 11,000, 12,000, 13,000, 14,000, 15,000 or other predetermined value indicative of a number of data points to assign to each partition. In some embodiments, the number of partitions may be the default value if the sample size is below a size threshold, such as, e.g., 1,000, 2,000, 3,000, 4,000, 5,000, 6,000, 7,000, 8,000, 9,000, 10,000, 11,000, 12,000, 13,000, 14,000, 15,000, 16,000, 17,000, 18,000, 19,000, 20,000 or other size threshold, such that if the sample size exceeds the size threshold then n_partitions is set according to the predetermined value and the sample size. In some embodiments, n_partitions and/or the predetermined value may be scaled to balance nearest neighbor accuracy against computation complexity, e.g., based on the target compute time of the smart sampling configuration 123. Thus, for stricter compute resource and/or time constraints, n_partitions may be decreased, e.g., by increasing the predetermined value, but for less strict constraints, n_partitions may be increased, e.g., by decreasing the predetermined value to improve nearest neighbor accuracy.

In some embodiments, upon constructing the KD-tree, the LPM-based smart sampling algorithm may update the inclusion probability via LPM 404 for each data point in a cluster by querying the KD-tree to find nearest neighbors. In some embodiments, using a particular data point, e.g., such as a randomly selected data point, the KD-tree may be traversed to arrive at the leaf to which the data point is assigned. If the value on an axis for a particular partition is smaller than the median of the node, the left subtree is searched, but if the value on the axis for the particular partition is greater than the median of the node, the right subtree is searched. In some embodiments, the search may backtrack and check if searching the other subtree is also needed. This process is performed with the particular data point until a node is reached that does not have a median defined, thus indicating a leaf of the KD-tree. The closest neighbor to the particular data point may then be identified by determining pairwise distances between the particular data point and each other data point assigned to the leaf, with the lowest pairwise distance being the closest neighbor. Thus, the KD-tree provide an approximation of nearest neighbors. An illustration of searching the KD-tree is provided in Algorithm 3 below:

Algorithm 3 Algorithm to query a k-d tree for the nearest-neighbor using the $L^2$ norm.

1:    initialize:
        Index the points in the set $\mathcal{X}$ with $\mathcal{I}$
        Query for index $a \in \mathcal{I}$
        $y \leftarrow x_a \in \mathcal{X}$
        dist $\leftarrow \infty$
2:    procedure SEARCH(A, i, (neighbor, dist))
3:      if A's median is defined, then
4:        Set j to i modulo k.
5:        $q \leftarrow$ A's median
6:        if $y_j \leq q$ then
7:          (neighbor, dist) $\leftarrow$ SEARCH($A_l$, i + 1, (neighbor, dist)),
8:          if $(y_j - q)^2 <$ dist then
9:            (neighbor, dist) $\leftarrow$ SEARCH($A_r$, i + 1, (neighbor, dist)).
10:         end if
11:      else
12:        (neighbor, dist) $\leftarrow$ SEARCH($A_r$, i + 1, (neighbor, dist))
13:        if $(y_j - q)^2 <$ dist then
14:          (neighbor, dist) $\leftarrow$ SEARCH($A_l$, i + 1, (neighbor, dist)).
15:        end if
16:      end if
17:    else
18:      for b in A's data do
19:        $z \leftarrow x_b$
20:        if $a \neq b$ then
21:          if $\|y - z\|_2^2 < dist$ then
22:            $dist \leftarrow \|y - z\|_2^2$
23:            neighbor $\leftarrow$ b
24:          end if
25:        end if
26:      end for
27:    end if
28:    return (neighbor, dist)
29:  end procedure In some embodiments, the search of the KD-tree may be made further efficient by selecting a random data point of the data points assigned to the leaf as the nearest neighbor to the particular data point. Such a technique reduces the computational resources that would otherwise be used by computing pairwise distances. In some embodiments, picking a random point may form an approximation of the nearest neighbor, particularly where the number of data points in the leaf is low, such as, e.g., at or below 20, at or below 15, at or below 10, etc. Additionally, by limiting the number of times the search may backtrack may reduce the computational resources. Moreover, the maximum amount of computation time or number of comparisons in a leaf node nearest neighbor search may be limited to reduce resource needs, such as, e.g., by limiting the pairwise distance measurements to a subset of the data points assigned to the leaf, e.g., and randomly selecting the subset.

In some embodiments, upon identifying the nearest neighbor (or approximate nearest neighbor) for a given data point, the LPM-based smart sampling algorithm may update the inclusion probability via LPM 404. In some embodiments, the inclusion probability for the given data point is determined based on whether the sum of the inclusion probability of each of the given data point and the nearest neighbor is greater than, equal to or less than 1. The inclusion probabilities for each of the data point and the nearest neighbor may then be updated according to Algorithm 1 above. Where one or more of the data points and/or the nearest neighbor are updated with an inclusion probability of 1, the data point and/or the nearest neighbor is selected for inclusion in a sub-sample for the cluster. Where one or more of the data points and/or the nearest neighbor are updated with an inclusion probability of 0, the data point and/or the nearest neighbor is deselected and removed from inclusion in the sub-sample for the cluster. In some embodiments, the inclusion probabilities are updated in accordance with Grafström, Anton & Lundström, Niklas & Schelin, Lina. (2011). Spatially Balanced Sampling through the Pivotal Method. Biometrics. 68. 514-20. 10.1111/j.1541-0420.2011.01699.x. which is incorporated herein by reference in its entirety.

In some embodiments, steps 403, 404 and 405 are repeated for each data point in the cluster until each data point in the cluster is either selected or de-selected for the sub-sample. Upon completing steps 403, 404 and 405 for each cluster, the LPM-based smart sampling algorithm may aggregate the data points of each sub-sample into a single sample. As a result, the LPM-based smart sampling method may output the smart sampled dataset 124 based on the nearest neighbor determination 403, inclusion probability via LPM 404 and sub-sample of selected points 405 performed on each cluster of data points. As a result, the smart sampled dataset 124 may be more efficiently created to provide an optimal representation of the dataset(s) 422A while being within computation resource constraints and/or limitations as well as time constraints and/or limitations.

Figure 5:
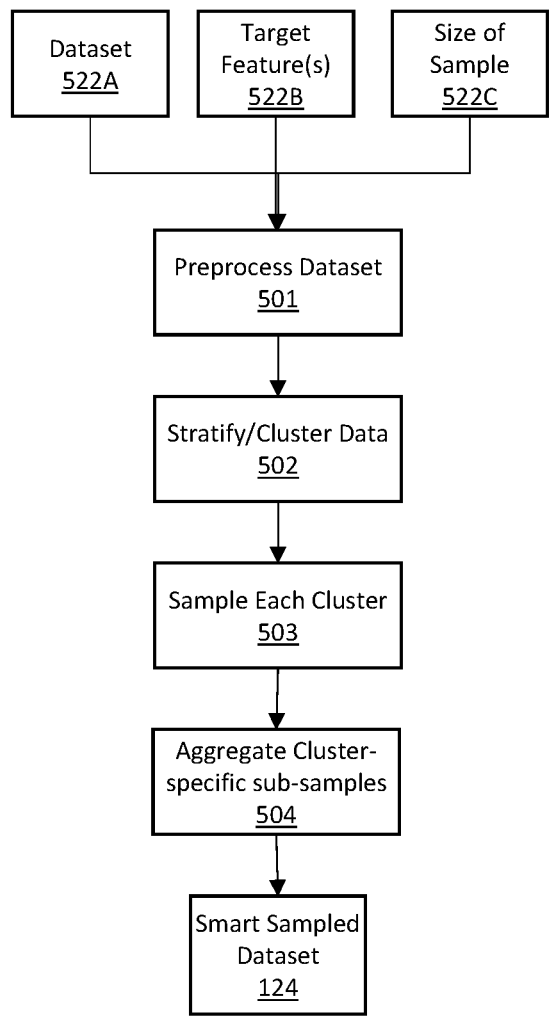
FIG. 5 is a block diagram of an exemplary computer-based system for smart dataset sampling using stratified random sampling in accordance with one or more embodiments of the present disclosure.

Referring to FIG. 5, a block diagram of an exemplary computer-based system for smart dataset sampling employing stratified random sampling ("stratified random smart sampling") is illustrated in accordance with one or more embodiments of the present disclosure.

In some embodiments, the smart sampling algorithm 108 may include a stratified random smart sampling algorithm. Accordingly, the smart sampling algorithm 108 may cause the smart sampling engine 110 to ingest as input the dataset 522A of the sample request 122, the size of the sample 522C and any the target feature(s) 522B specified by the user. In some embodiments, the user may omit target feature(s) 522B.

In some embodiments, the stratified random smart sampling algorithm may preprocess dataset 501 to prepare the dataset(s) 522A for clustering. In some embodiments, pre-processing the dataset may include operations for cleansing and normalizing the data points in the dataset(s) 522A, such as, e.g., ensuring common formatting, filling empty data fields/values, ensuring data quality, among other operations or any combination thereof.

In some embodiments, cleansing and normalizing operations may include, e.g., removing low quality features from the dataset as defined by a number of data points having missing/non-missing fields and/or values for a given feature. For example, if a missing/non-missing threshold, e.g., 60%, 65%, 70%, 75%, 80%, 85%, 90%, 95%, 97%, 98%, 99%, 99.5% or other missing/non-missing threshold of data points have non-missing values for a particular feature, then the feature is considered a "good" or "high quality" feature. In some embodiments, the missing/non-missing threshold may instead or in addition be a top K number of features according to amount of non-missing values across data points, where K may be, e.g., 2, 3, 4, 5, 6, 7, 8, 9, 10, 11, 12, 13, 14, 15, 16, 17, 18, 19, 20, etc. In some embodiments, the high-quality or good features may remain while the remainder of features may be cleansed from the dataset(s) 522A by removing the remainder of features from each data point.

In some embodiments, cleansing and normalizing operations may include, e.g., using an imputer (e.g., mean, median, weighted mean, etc.) to fill blank or "not-a-number" (NaN) values. If data points with missing values are removed, the dataset(s) 522A could end up with an empty data frame or if those data points are removed only for fitting the clustering model, those data points would not be clustered or improperly clustered. Indeed, values are needed to make predictions on the data points.

In some embodiments, the dataset(s) 522A may include features having categorical data as opposed to numerical values. Clustering data based on categorical data, or a mix of categorical data and numerical values may be difficult. Thus, the categorical data may be transformed into numerical data using an encoding technique. For example, the categorical data may be one-hot encoded. In some embodiments, one-hot encoding can include one-hot encoding for each category of the categorical data. However, in some embodiments, similar to the one-hot encoding of the Smart Mapping technique for feature importance analysis 302 detailed above with reference to FIG. 3, the most frequently occurring categories in the data may be one-hot encoded (e.g., the top 2, 3, 4, 5, 6, 7, 8, 9, 10, etc. most frequent categories), and the remaining categories encoded as, e.g., "other". Additionally, or alternatively, other encoding techniques may be employed, such as ordinal encoding.

In some embodiments, data points having one or more field(s) with missing categorical data may be pre-processed to remove the field(s), remove the data points, impute a most frequent category from the dataset(s) 522A for the field(s), apply an "other" or "missing" category to the field(s), or any other pre-processing to address missing categorical data, or any combination thereof.

In some embodiments, such operations may include, e.g., adding a new feature to each data point that holds a vector to be used as input for the clustering algorithm. In some embodiments, the vector may be a vectorization of the features of the data point, including any cleansed and/or normalized fields/values. In some embodiments, where the target feature(s) 522B are provided, the vector feature may be a vectorization of the fields/values of the target feature(s) 522B of each data point. In some embodiments, where the target feature(s) 522B are not provided, the vector feature may be a vectorization of the fields/values of all remaining features of each data point after pre-processing.

In some embodiments, using the vector feature of each data point, the Stratified random sampling algorithm may stratify/cluster data 502. In some embodiments, the user may define specific stratification criteria, e.g., by defining grouping or filtering criteria that form the stratification. Alternatively, or in addition, in some embodiments, to improve sampling representation of the dataset(s) 522A, the stratified random smart sampling algorithm may use a clustering model to create the stratification. For example, in some embodiments, to stratify/cluster the data 502, the stratified random sampling algorithm may a clustering algorithm using the vector feature of each data point, such as, e.g., K-Means or K-Means++, K-nearest neighbor, DBSCAN, HDBSCAN, fuzzy clustering, spectral clustering or other clustering algorithm or any combination thereof. In some embodiments, where K-means or K-means++ clustering is used, the number of clusters may be, e.g., an input-dependent selection/parameter of the smart sampling configuration 123, an algorithm or rules-based number based on, e.g., the size of the dataset(s) 522A and/or the size of the sample 522C, or other technique for setting K. For example, in some embodiments, K may be set as a function of the size(s) of the dataset(s) 522A, such as, e.g., square_root(s), cube_root(s), fourth_root(s), s divided by the size of the sample, or other suitable function or any combination thereof.

In some embodiments, upon clustering the dataset(s) 522A, the stratified random sampling algorithm may sample each cluster 503 to form cluster-specific sub-samples. To do so, in some embodiments, the stratified random sampling algorithm may iterate over the clusters and from each cluster randomly select a sub-sample of data points. For example, the stratified random sampling algorithm may perform, on each cluster, simple random sampling, systematic random sampling, balanced sampling, model assisted estimation, probability sampling, smart sampling (e.g., validation-based and/or LPM-based smart sampling as detailed above with respect to FIGS. 3 and 4, respectively) among other sampling methods or any combination thereof.

In some embodiments, each cluster may be sampled to produce a constant number of data points for the sub-sample of each cluster. In some embodiments, the sample size for each cluster-specific sub-sample may be computed based on the size of the cluster. For example, a percentage of data points of the dataset(s) 522A in a given cluster may be used to define the size of the sub-sample of the given cluster as the same percentage of the size of the sample 522C. Thus, the size of the sub-sample may be proportional to the size of the cluster relative to the dataset(s) 522A and/or each other cluster.

In some embodiments, upon completing step 503 for each cluster, the stratified random sampling algorithm may aggregate the cluster-specific sub-samples 504 by aggregating the data points of each sub-sample into a single sample. The single sample may then be output as the smart sampled dataset 124.

Figure 6:
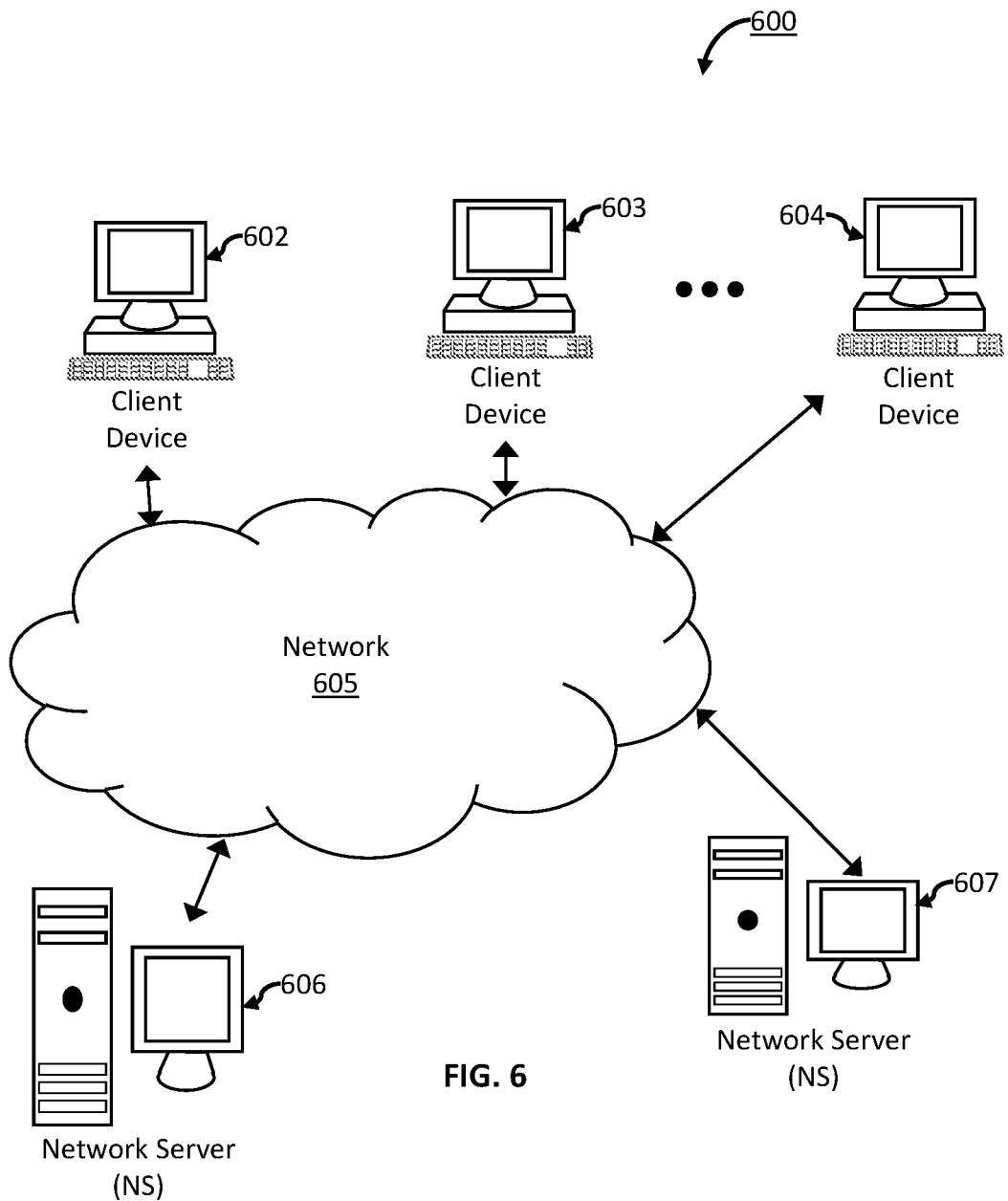
FIG. 6 depicts a block diagram of an exemplary computer-based system and platform for smart sampling of datasets in accordance with one or more embodiments of the present disclosure.

FIG. 6 depicts a block diagram of an exemplary computer-based system and platform 600 for smart sampling of datasets in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, client device 602, client device 603 through client device 604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the client devices 602 through 604 may be personal computers, multiprocessor systems, microprocessor-based or programmable consumer electronics, network PCs, and the like. In some embodiments, one or more client devices within client devices 602 through 604 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 602 through 604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 602 through 604 may include may run one or more applications, such as Internet browsers, mobile applications, voice calls, video games, videoconferencing, and email, among others. In some embodiments, one or more client devices within client devices 602 through 604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 602 through 604 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 602 through 604 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Apache on Linux or Microsoft IIS (Internet Information Services). In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 601 through 604.

In some embodiments and, optionally, in combination of any embodiment described above or below, for example, one or more exemplary computing client devices 602 through 604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 7:
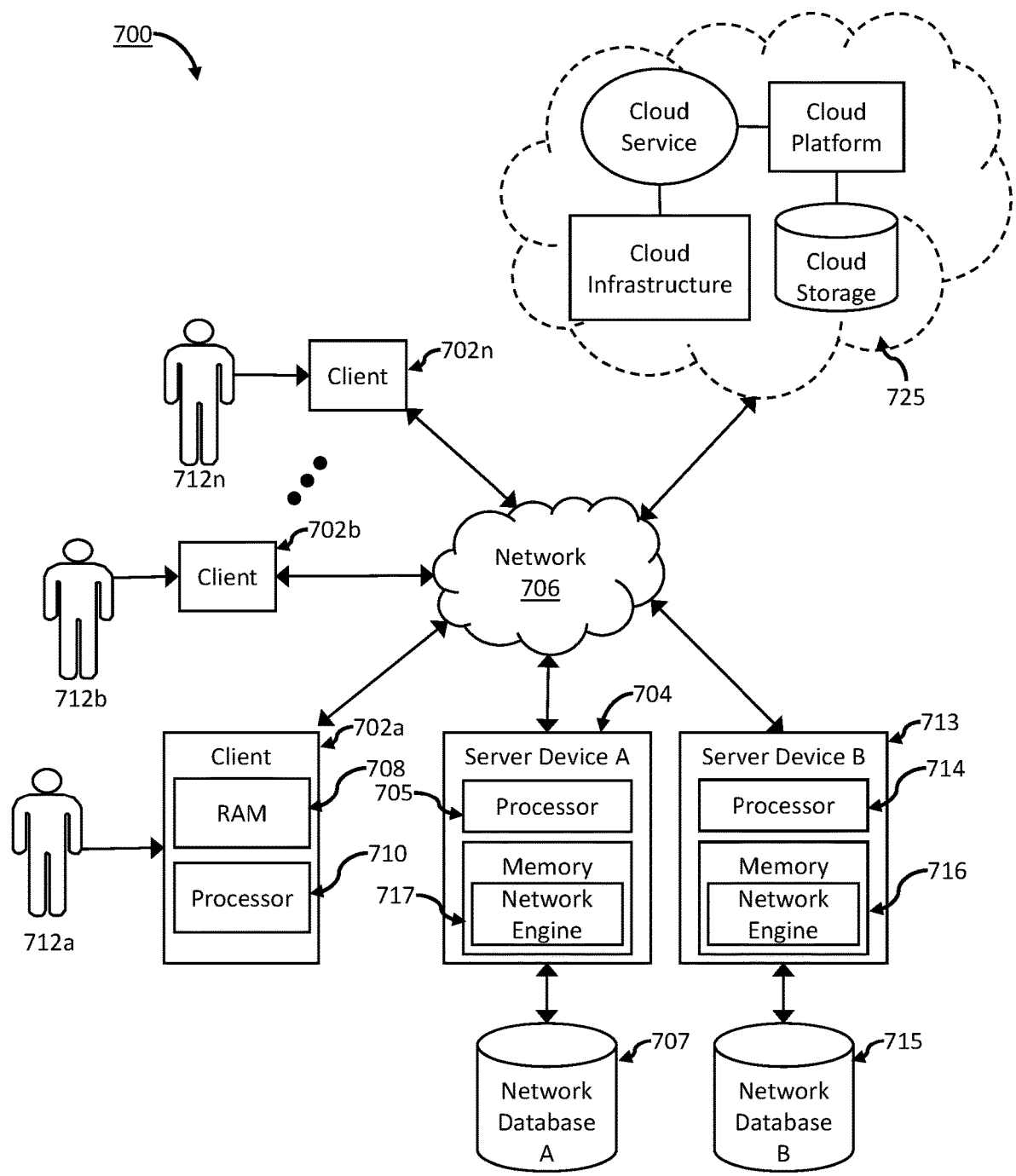
FIG. 7 depicts a block diagram of another exemplary computer-based system and platform for smart sampling of datasets in accordance with one or more embodiments of the present disclosure.

FIG. 7 depicts a block diagram of another exemplary computer-based system and platform 700 for smart sampling of datasets in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client device 702a, client device 702b through client device 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client device 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 702a through 702n may also comprise a number of external or internal devices such as a mouse, a CD-ROM, DVD, a physical or virtual keyboard, a display, or other input or output devices. In some embodiments, examples of client devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, client devices 702a through 702n may be specifically programmed with one or more application programs in accordance with one or more principles/methodologies detailed herein. In some embodiments, client devices 702a through 702n may operate on any operating system capable of supporting a browser or browser-enabled application, such as Microsoft™, Windows™, and/or Linux. In some embodiments, client devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, user 712a, user 712b through user 712n, may communicate over the exemplary network 706 with each other and/or with other systems and/or devices coupled to the network 706. As shown in FIG. 7, exemplary server devices 704 and 713 may include processor 705 and processor 714, respectively, as well as memory 717 and memory 716, respectively. In some embodiments, the server devices 704 and 713 may be also coupled to the network 706. In some embodiments, one or more client devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
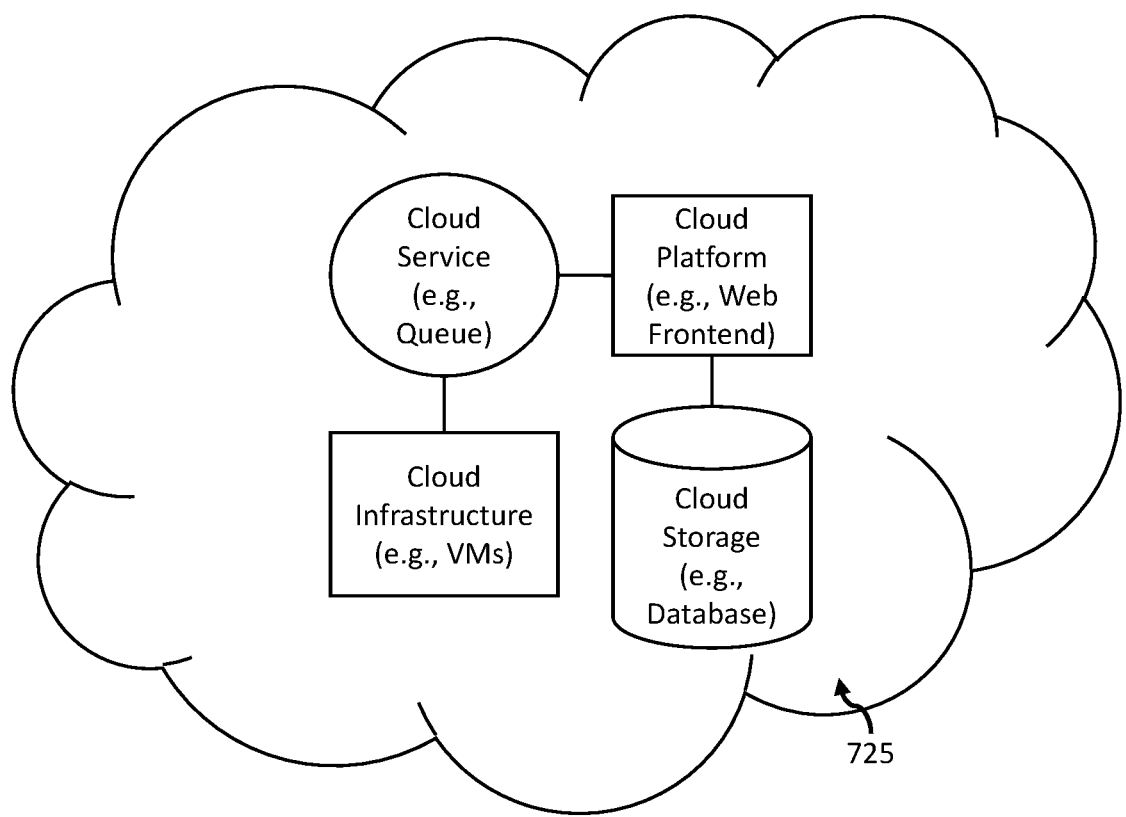
FIG. 8 depicts illustrative schematics of an exemplary implementation of the cloud computing/architecture(s) in which embodiments of a system for smart sampling of datasets may be specifically configured to operate in accordance with some embodiments of the present disclosure.
Figure 9:
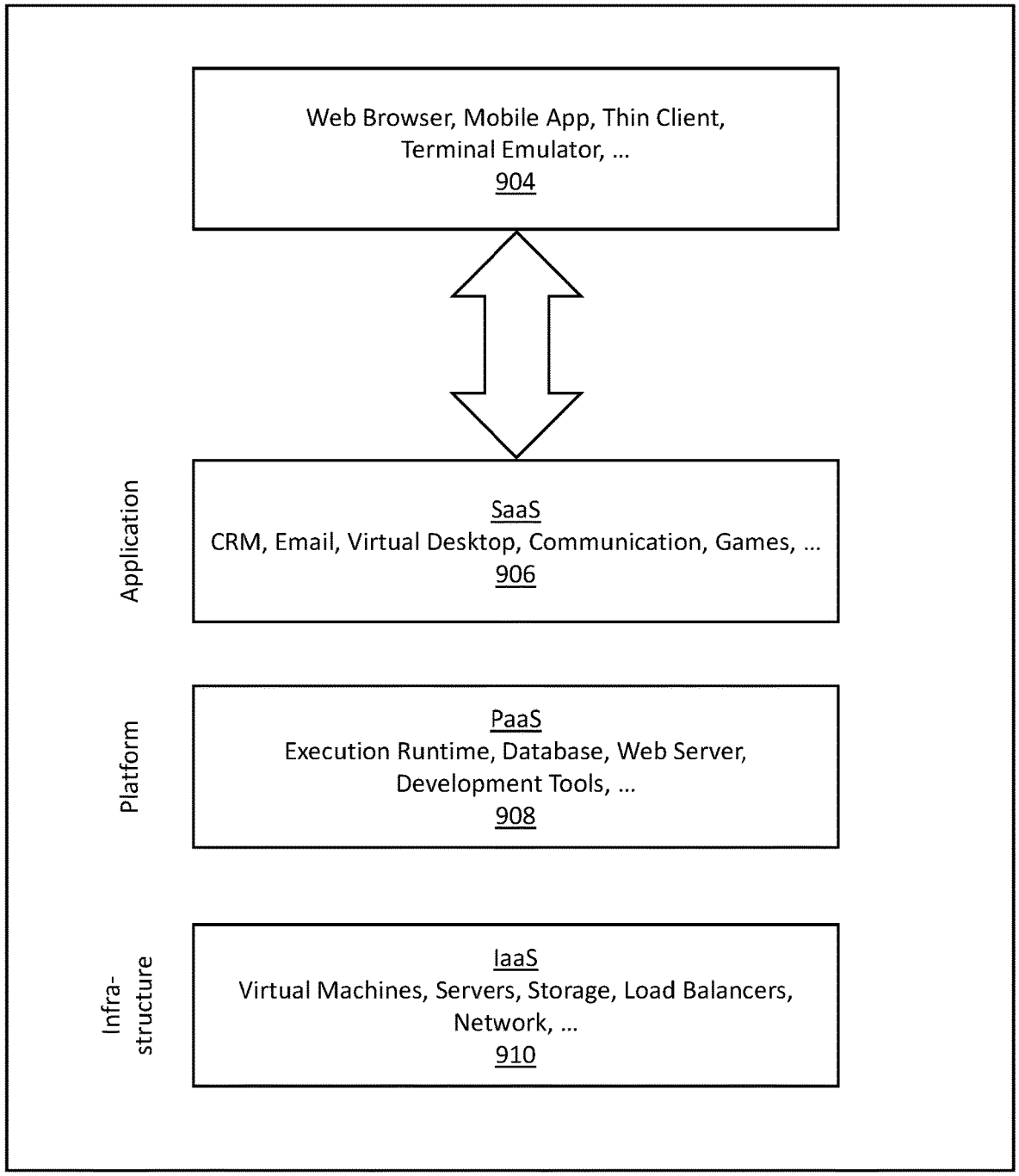
FIG. 9 depicts illustrative schematics of another exemplary implementation of the cloud computing/architecture(s) in which embodiments of a system for smart sampling of datasets may be specifically configured to operate in accordance with some embodiments of the present disclosure.

In some embodiments, the exemplary smart sampling system of the present disclosure may be specifically configured to operate in a cloud computing/architecture 725 such as, but not limiting to: infrastructure a service (IaaS) 910, platform as a service (PaaS) 908, and/or software as a service (Saas) 906 using a web browser, mobile app, thin client, terminal emulator, or other endpoint 904. FIGS. 8 and 9 illustrate schematics of exemplary implementations of the cloud computing/architecture(s) in which the smart sampling system of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative, and not restrictive.

At least some aspects of the present disclosure will now be described with reference to the following numbered clauses.

Clause 1. A method and/or system including:
  receiving, by at least one processor, a sample request from at least one computing device associated with a user;
  where the sample request includes:
    a dataset including a plurality of data points, each data point including a plurality of features,
    at least one target feature of the plurality of features,
    a sample size, and
    a target computation time;

accessing, by the at least one processor, based on the sample request, a smart sampling algorithm in a library of smart sampling algorithms for use to sample the dataset;

configuring, by the at least one processor, a smart sampling engine to implement the smart sampling algorithm to produce a smart sampled dataset having a size based on the sample, where the smart sample dataset includes a sample of the plurality of data points that represents the at least one target feature;

generating, by the at least one processor, the smart sample dataset by inputting the dataset into the smart sampling engine to execute the smart sampling algorithm to output the sample of the plurality of data points that represents the at least one target feature; and returning, by the at least one processor, the smart sample dataset to the at least one computing device in response to the sample request.

Clause 2. The method and/or system as recited in clause 1, where executing the smart sampling algorithm includes:

determining, by the at least one processor, a feature importance of each feature of the plurality of data points in the dataset;

determining, by the at least one processor, at least one anomalous data point of the plurality of data points by inputting each data point into at least one anomaly detection model to output label indicative of whether each data point is anomalous or non-anomalous;

generating, by the at least one processor, plurality of candidate samples based on randomly sampling the dataset;

filtering, by the at least one processor, the plurality of candidate samples against a number of the at least one anomalous data point;

determining, by the at least one processor, at least one test statistic for the plurality of candidate samples based at least in part on a similarity of:
  a candidate sample distribution associated with the plurality of candidate samples, and
  a dataset distribution associated with the dataset;

filtering, by the at least one processor, the plurality of candidate samples based at least in part on the at least one test statistic;

determining, by the at least one processor, a target feature importance of the at least one target feature of the plurality of candidate samples;

determining, by the at least one processor, a ranking of the plurality of candidate samples based at least in part on a similarity measure of the target feature importance of each candidate sample to the feature importance of the dataset; and generating, by the at least one processor, the smart sample dataset as a highest ranked candidate sample of the plurality of candidate samples based at least in part on the ranking.

Clause 3. The method and/or system as recited in clause 1, where executing the smart sampling algorithm includes:

generating, by the at least one processor, a plurality of clusters of stratified data points from the plurality of data points in the dataset using at least one clustering model;

for each cluster of the plurality of clusters, generating, by the at least one processor, a cluster-specific sub-sample based at least in part on simple random sampling of each cluster; and aggregating, by the at least one processor, the cluster-specific sub-sample of each cluster to produce the smart sampled dataset.

Clause 4. The method and/or system as recited in clause 1, where executing the smart sampling algorithm includes:

generating, by the at least one processor, a plurality of clusters of stratified data points from the plurality of data points in the dataset using at least one clustering model;

for each cluster of the plurality of clusters:
  generating, by the at least one processor, a k-dimensional tree (KD-tree) for the stratified data points associated with each cluster;
  iteratively over the stratified data points of each cluster:
    selecting, by the at least one processor, a particular stratified data point;
    querying, by the at least one processor, the KD-tree to determine a nearest neighbor of the particular stratified data point; and
    utilizing, by the at least one processor, update an inclusion probability for each of the particular stratified data point and the nearest neighbor;

creating, by the at least one processor, a sub-sample for each cluster based at least in part on the inclusion probability of each stratified data point in each cluster; and aggregating, by the at least one processor, the sub-sample of each cluster to produce the smart sampled dataset.

Clause 5. The method and/or system as recited in clause 1, further including automatically determining, by the at least one processor, based on the sample request, the smart sampling algorithm from the library of smart sampling algorithms.

Clause 6. The method and/or system as recited in clause 5, further including:

matching, by the at least one processor, the sample size, and the target computation time to at least one parameter associated with each smart sampling algorithm in the library of smart sampling algorithm; and automatically determining, by the at least one processor, based on the sample size, the target computation time and the at least one parameter associated with each smart sampling algorithm, the smart sampling algorithm from the library of smart sampling algorithms.

Clause 7. The method and/or system as recited in clause 1, further including:

generating, by the at least one processor, at least one user interface on a display of the at least one computing device, where the at least one user interface is configured to enable the user to select at least one additional parameter associated with the sample request; and determining, by the at least one processor, based on the sample request and the at least one additional parameter, the smart sampling algorithm from the library of smart sampling algorithms.

Clause 8. The method and/or system as recited in clause 1, further including:

generating, by the at least one processor, at least one user interface on a display of the at least one computing device, where the at least one user interface is configured to enable the user to select the smart sampling algorithm; and accessing, by the at least one processor, the smart sampling algorithm in the library of smart sampling algorithms.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiment of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
   receiving, by at least one processor, a sample request from at least one computing device associated with a user;
     wherein the sample request comprising:
       a dataset comprising a plurality of data points to form a plurality of user-defined parameters of the sample request, each data point comprising a plurality of features, the plurality of user-defined parameters of the sample request comprising:
         at least one target feature of the plurality of features,
         a sample size of a smart sampled dataset to be produced, and
         at least one user-defined sampling parameter value of at least one sampling parameter defining a target computation time for generating the smart sampled dataset;
         wherein the at least one user-defined sampling parameter is utilized to generate a smart sampled dataset comprising a representative selection of the plurality of data points;
         wherein the representative selection represents the at least one target feature;
   generating, by the at least one processor, based on the sample request, a query to a library of smart sampling algorithms storing a plurality of smart sampling algorithms to obtain a smart sampling algorithm;
     wherein the query comprises the plurality of user-defined parameters comprising the target computation time so as to identify the smart sampling algorithm optimized for the at least one user-defined sampling parameter value of the sample request in response to an obtaining of the smart sampling algorithm;
     wherein the library of smart sampling algorithms comprises a plurality of associations between the plurality of smart sampling algorithms and a plurality of user-defined sampling parameter values and, for each smart sampling algorithm, stores runtime profile data indicating at least one computation-time value for which the algorithm is optimized in order to return, in response to the query, the smart sampling algorithm optimized for the at least one user-defined sampling parameter value of the sample request;
     wherein the library is configured to define at least one particular value of the at least one sampling parameter and at least one computation-time value for which each smart sampling algorithm of the plurality of smart sampling algorithms is optimized in generating the smart sampled dataset comprising the representative selection, representing the at least one target feature;
   predicting, by the at least one processor, for each candidate smart sampling algorithm in the library, a runtime for generating the smart sampled dataset based on the stored runtime profile data and the parameters of the sample request;
   selecting, by the at least one processor, a smart sampling algorithm whose predicted runtime does not exceed the target computation time;
   configuring, by the at least one processor, the at least one sampling parameter of the smart sampling algorithm of a smart sampling engine to obtain a configured smart sampling engine to generate the smart sampled dataset having the sample size of the sample request;
     wherein the smart sampled dataset comprises a sample of the plurality of data points so as to represent the at least one target feature;
   inputting, by the at least one processor, the dataset into the configured smart sampling engine so as to cause the configured smart sampling engine to:
   execute the smart sampling algorithm, and
   output the smart sampled dataset comprising the representative selection of the plurality of data points that represents the at least one target feature; and
   storing, by the at least one processor, the smart sampled dataset to the at least one computing device in response to the sample request to provide the representative selection of the plurality of data points for at least one subsequent operation.

2. The method of claim 1, wherein executing the smart sampling algorithm comprises:
   determining, by the at least one processor, a feature importance of each feature of the plurality of data points in the dataset;
   determining, by the at least one processor, at least one anomalous data point of the plurality of data points by inputting each data point into at least one anomaly detection model to output label indicative of whether each data point is anomalous or non-anomalous;
   generating, by the at least one processor, plurality of candidate samples based on randomly sampling the dataset;
   filtering, by the at least one processor, the plurality of candidate samples against a number of the at least one anomalous data point;
   determining, by the at least one processor, at least one test statistic for the plurality of candidate samples based at least in part on a similarity of:
     a candidate sample distribution associated with the plurality of candidate samples, and
     a dataset distribution associated with the dataset;
   filtering, by the at least one processor, the plurality of candidate samples based at least in part on the at least one test statistic;
   determining, by the at least one processor, a target feature importance of the at least one target feature of the plurality of candidate samples;
   determining, by the at least one processor, a ranking of the plurality of candidate samples based at least in part on a similarity measure of the target feature importance of each candidate sample to the feature importance of the dataset; and
   generating, by the at least one processor, the smart sampled dataset as a highest ranked candidate sample of the plurality of candidate samples based at least in part on the ranking.

3. The method as recited in claim 1, wherein executing the smart sampling algorithm comprises:

generating, by the at least one processor, a plurality of clusters of stratified data points from the plurality of data points in the dataset using at least one clustering model;

for each cluster of the plurality of clusters, generating, by the at least one processor, a cluster-specific sub-sample based at least in part on simple random sampling of each cluster; and aggregating, by the at least one processor, the cluster-specific sub-sample of each cluster to produce the smart sampled dataset.

4. The method as recited in claim 1, wherein executing the smart sampling algorithm comprises:

generating, by the at least one processor, a plurality of clusters of stratified data points from the plurality of data points in the dataset using at least one clustering model;

for each cluster of the plurality of clusters:
generating, by the at least one processor, a k-dimensional tree (KD-tree) for the stratified data points associated with each cluster;
iteratively over the stratified data points of each cluster:
selecting, by the at least one processor, a particular stratified data point;
querying, by the at least one processor, the KD-tree to determine a nearest neighbor of the particular stratified data point; and
utilizing, by the at least one processor, update an inclusion probability for each of the particular stratified data point and the nearest neighbor;

creating, by the at least one processor, a sub-sample for each cluster based at least in part on the inclusion probability of each stratified data point in each cluster; and aggregating, by the at least one processor, the sub-sample of each cluster to produce the smart sampled dataset.

5. The method as recited in claim 1, wherein the at least one sampling parameter comprises a configured number of partitions from which to sample the plurality of data points.

6. The method as recited in claim 1, further comprising:
matching, by the at least one processor, the sample size, and the at least one user-defined sampling parameter value to the smart sampling algorithm based at least in part on an index in the library of smart sampling algorithm; and
automatically determining, by the at least one processor, based on the sample size, the at least one user-defined sampling parameter value and the index, the smart sampling algorithm from the library of smart sampling algorithms.

7. The method as recited in claim 1, further comprising:
generating, by the at least one processor, at least one user interface on a display of the at least one computing device, wherein the at least one user interface is configured to enable the user to select at least one additional sampling parameter associated with the sample request; and
determining, by the at least one processor, based on the sample request and the at least one additional sampling parameter, the smart sampling algorithm from the library of smart sampling algorithms.

8. The method as recited in claim 1, further comprising:
generating, by the at least one processor, at least one user interface on a display of the at least one computing device, wherein the at least one user interface is configured to enable the user to select the smart sampling algorithm; and accessing, by the at least one processor, the smart sampling algorithm in the library of smart sampling algorithms.

9. A method comprising:
receiving, by at least one processor, a sample request from at least one computing device associated with a user;
wherein the sample request comprises:
a dataset comprising a plurality of data points to form a plurality of user-defined parameters of the sample request, each data point comprising a plurality of features, the plurality of user-defined parameters of the sample request comprising:
at least one target feature of the plurality of features,
a sample size of a smart sampled dataset to be produced, and
a target computation time for generating a smart sampled dataset comprising a representative selection of the plurality of data points that represents the at least one target feature;
generating, by the at least one processor, based on the sample request, a query to a library of smart sampling algorithms storing a plurality of smart sampling algorithms to obtain a smart sampling algorithm;
wherein the query comprises the plurality of user-defined parameters comprising the target computation time so as to identify the smart sampling algorithm optimized for the target computation time of the sample request in response to an obtaining of the smart sampling algorithm;
wherein the library of smart sampling algorithms comprises a plurality of associated between the plurality of smart sampling algorithms and a plurality of user-defined sampling parameter values and, for each smart sampling algorithm, stores runtime profile data indicating at least one computation-time value for which the algorithm is optimized in order to return, in response to the query, the smart sampling algorithm optimized for the target computation time of the sample request;
wherein the library is configured to define at least one particular value of the target computation time for which each smart sampling algorithm of the plurality of smart sampling algorithms is optimized in generating the smart sampled dataset comprising the representative selection representing the at least one target feature;
wherein the library of smart sampling algorithms comprises at least one of:
a smart stratified random sampling algorithm,
a smart local pivotal method sampling algorithm, or
a smart validation-based sampling algorithm;
predicting, by the at least one processor, for each candidate smart sampling algorithm in the library, a runtime for generating the smart sampled dataset based on the stored runtime profile data and the parameters of the sample request;
selecting, by the at least one processor, a smart sampling algorithm whose predicted runtime does not exceed the target computation time;
configuring, by the at least one processor, the at least one sampling parameter of the smart sampling algorithm of a smart sampling engine to obtain a configured smart sampling engine to generate, within the target computation time, a smart sampled dataset having the sample size of the sample request;

wherein the smart sampled dataset comprises a sample of the plurality of data points so as to represent the at least one target feature;

inputting, by the at least one processor, the dataset into the configured smart sampling engine so as to cause the configured smart sampling engine to:
   execute the smart sampling algorithm within the target computation time, and
   output the smart sampled dataset comprising the representative selection of the plurality of data points that represents the at least one target feature; and storing, by the at least one processor, the smart sampled dataset to the at least one computing device in response to the sample request to provide the representative selection of the plurality of data points for at least one subsequent operation.

10. The method of claim 9, wherein the smart sampling algorithm comprises the smart validation-based sampling algorithm;
   wherein executing the smart validation-based sampling algorithm comprises:
      determining, by the at least one processor, a feature importance of each feature of the plurality of data points in the dataset;
      determining, by the at least one processor, at least one anomalous data point of the plurality of data points by inputting each data point into at least one anomaly detection model to output label indicative of whether each data point is anomalous or non-anomalous;
      generating, by the at least one processor, plurality of candidate samples based on randomly sampling the dataset;
      filtering, by the at least one processor, the plurality of candidate samples against a number of the at least one anomalous data point;
      determining, by the at least one processor, at least one test statistic for the plurality of candidate samples based at least in part on a similarity of:
         a candidate sample distribution associated with the plurality of candidate samples, and
         a dataset distribution associated with the dataset;
      filtering, by the at least one processor, the plurality of candidate samples based at least in part on the at least one test statistic;
      determining, by the at least one processor, a target feature importance of the at least one target feature of the plurality of candidate samples;
      determining, by the at least one processor, a ranking of the plurality of candidate samples based at least in part on a similarity measure of the target feature importance of each candidate sample to the feature importance of the dataset; and
      generating, by the at least one processor, the smart sampled dataset as a highest ranked candidate sample of the plurality of candidate samples based at least in part on the ranking.

11. The method as recited in claim 9, wherein the smart sampling algorithm comprises the smart stratified random sampling algorithm;
   wherein executing the smart stratified random sampling algorithm comprises:
      generating, by the at least one processor, a plurality of clusters of stratified data points from the plurality of data points in the dataset using at least one clustering model;
      for each cluster of the plurality of clusters, generating, by the at least one processor, a cluster-specific sub-sample based at least in part on simple random sampling of each cluster; and
      aggregating, by the at least one processor, the cluster-specific sub-sample of each cluster to produce the smart sampled dataset.

12. The method as recited in claim 9, wherein the smart sampling algorithm comprises the smart local pivotal method sampling algorithm;
   wherein executing the smart local pivotal method sampling algorithm comprises:
      generating, by the at least one processor, a plurality of clusters of stratified data points from the plurality of data points in the dataset using at least one clustering model;
      for each cluster of the plurality of clusters:
         generating, by the at least one processor, a k-dimensional tree (KD-tree) for the stratified data points associated with each cluster;
         iteratively over the stratified data points of each cluster:
            selecting, by the at least one processor, a particular stratified data point;
            querying, by the at least one processor, the KD-tree to determine a nearest neighbor of the particular stratified data point; and
            utilizing, by the at least one processor, update an inclusion probability for each of the particular stratified data point and the nearest neighbor;
         creating, by the at least one processor, a sub-sample for each cluster based at least in part on the inclusion probability of each stratified data point in each cluster; and
      aggregating, by the at least one processor, the sub-sample of each cluster to produce the smart sampled dataset.

13. The method as recited in claim 9, wherein the at least one sampling parameter comprises a configured number of partitions from which to sample the plurality of data points.

14. The method as recited in claim 9, further comprising:
   matching, by the at least one processor, the sample size, and the target computation time to at least one parameter associated with each smart sampling algorithm in the library of smart sampling algorithm; and
   automatically determining, by the at least one processor, based on the sample size, the target computation time and the at least one parameter associated with each smart sampling algorithm, the smart sampling algorithm from the library of smart sampling algorithms.

15. The method as recited in claim 9, further comprising:
   generating, by the at least one processor, at least one user interface on a display of the at least one computing device, wherein the at least one user interface is configured to enable the user to select at least one additional parameter associated with the sample request; and
   determining, by the at least one processor, based on the sample request and the at least one additional parameter, the smart sampling algorithm from the library of smart sampling algorithms.

16. The method as recited in claim 9, further comprising:
   generating, by the at least one processor, at least one user interface on a display of the at least one computing device, wherein the at least one user interface is configured to enable the user to select the smart sampling algorithm; and accessing, by the at least one processor, the smart sampling algorithm in the library of smart sampling algorithms.

17. A system comprising:

at least one processor in communication with a non-transitory computer readable medium having software instructions stored thereon, wherein the at least one processor is configured, upon execution of the software instructions, to:
receive a sample request from at least one computing device associated with a user;
wherein the sample request comprising:
a dataset comprising a plurality of data points to form a plurality of user-defined parameters of the sample request, each data point comprising a plurality of features, the plurality of user-defined parameters of the sample request comprising:
at least one target feature of the plurality of features,
a sample size of a smart sampled dataset to be produced, and
at least one user-defined sampling parameter value of at least one sampling parameter defining a target computation time for generating the smart sampled dataset;
wherein the at least one sampling parameter is utilized to a smart sampled dataset comprising a generate representative selection of the plurality of data points;
wherein the representative selection represents the at least one target feature;
generate, based on the sample request, a query to a library of smart sampling algorithms storing a plurality of smart sampling algorithms to obtain a smart sampling algorithm;
wherein the query comprises the plurality of user-defined parameters comprising the target computation time so as to identify the smart sampling algorithm optimized for the at least one user-defined sampling parameter value of the sample request in response to an obtaining of the smart sampling algorithm;
wherein the library of smart sampling algorithms comprises a plurality of associations between the plurality of smart sampling algorithms and a plurality of user-defined sampling parameter values and, for each smart sampling algorithm, stores runtime profile data indicating at least one computation-time value for which the algorithm is optimized in order to return, in response to the query, the smart sampling algorithm optimized for the at least one user-defined sampling parameter value of the sample request;
wherein the library is configured to define at least one particular value of the at least one sampling parameter and at least one computation-time value for which each smart sampling algorithm of the plurality of smart sampling algorithms is optimized in generating the smart sampled dataset comprising the representative selection representing the at least one target feature;
predict each candidate smart sampling algorithm in the library, a runtime for generating the smart sampled dataset based on the stored runtime profile data and the parameters of the sample request;
select a smart sampling algorithm whose predicted runtime does not exceed the target computation time;
configure the at least one sampling parameter of the smart sampling algorithm of a smart sampling engine to obtain a configured smart sampling engine to generate a smart sampled dataset having the sample size of the sample request;
wherein the smart sampled dataset comprises a sample of the plurality of data points so as to represent the at least one target feature;
input the dataset into the configured smart sampling engine so as to cause the configured smart sampling engine to:
execute the smart sampling algorithm, and
output the smart sampled dataset comprising the representative selection of the plurality of data points that represents the at least one target feature; and
store the smart sampled dataset to the at least one computing device in response to the sample request to provide the representative selection of the plurality of data points for at least one subsequent operation.

18. The system of claim 17, wherein executing the smart sampling algorithm comprises causing the at least one processor to:
determine a feature importance of each feature of the plurality of data points in the dataset;
determine at least one anomalous data point of the plurality of data points by inputting each data point into at least one anomaly detection model to output label indicative of whether each data point is anomalous or non-anomalous;
generate plurality of candidate samples based on randomly sampling the dataset;
filter the plurality of candidate samples against a number of the at least one anomalous data point;
determine at least one test statistic for the plurality of candidate samples based at least in part on a similarity of:
a candidate sample distribution associated with the plurality of candidate samples, and
a dataset distribution associated with the dataset;
filter the plurality of candidate samples based at least in part on the at least one test statistic;
determine a target feature importance of the at least one target feature of the plurality of candidate samples;
determine a ranking of the plurality of candidate samples based at least in part on a similarity measure of the target feature importance of each candidate sample to the feature importance of the dataset; and
generate the smart sampled dataset as a highest ranked candidate sample of the plurality of candidate samples based at least in part on the ranking.

19. The system as recited in claim 17, wherein executing the smart sampling algorithm comprises causing the at least one processor to:
generate a plurality of clusters of stratified data points from the plurality of data points in the dataset using at least one clustering model;
for each cluster of the plurality of clusters, generate a cluster-specific sub-sample based at least in part on simple random sampling of each cluster; and
aggregate the cluster-specific sub-sample of each cluster to produce the smart sampled dataset.

20. The system as recited in claim 17, wherein executing the smart sampling algorithm comprises causing the at least one processor to:
- generate a plurality of clusters of stratified data points from the plurality of data points in the dataset using at least one clustering model;
- for each cluster of the plurality of clusters:
  - generate a k-dimensional tree (KD-tree) for the stratified data points associated with each cluster;
  - iteratively over the stratified data points of each cluster:
  - select a particular stratified data point;
  - query the KD-tree to determine a nearest neighbor of the particular stratified data point; and
  - utilize update an inclusion probability for each of the particular stratified data point and the nearest neighbor;
- create a sub-sample for each cluster based at least in part on the inclusion probability of each stratified data point in each cluster; and
- aggregate the sub-sample of each cluster to produce the smart sampled dataset.

* * * * *